(12) United States Patent
Akaike et al.

(10) Patent No.: US 10,452,557 B2
(45) Date of Patent: Oct. 22, 2019

(54) STORAGE APPARATUS, COMPUTER SYSTEM, AND METHOD FOR IMPROVED READ OPERATION HANDLING

(71) Applicant: Hitachi, Ltd., Tokyo (JP)

(72) Inventors: Hirotoshi Akaike, Tokyo (JP); Norio Shimozono, Tokyo (JP); Kazushi Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 15/540,042

(22) PCT Filed: Jan. 28, 2015

(86) PCT No.: PCT/JP2015/052313
§ 371 (c)(1),
(2) Date: Jun. 27, 2017

(87) PCT Pub. No.: WO2016/121026
PCT Pub. Date: Aug. 4, 2016

(65) Prior Publication Data
US 2018/0018272 A1    Jan. 18, 2018

(51) Int. Cl.
*G06F 12/10* (2016.01)
*G06F 12/02* (2006.01)
*G06F 3/06* (2006.01)

(52) U.S. Cl.
CPC .............. *G06F 12/10* (2013.01); *G06F 3/061* (2013.01); *G06F 3/0635* (2013.01); *G06F 3/0659* (2013.01); *G06F 3/0688* (2013.01); *G06F 12/0246* (2013.01); *G06F 2212/657* (2013.01);

(Continued)

(58) Field of Classification Search
None
See application file for complete search history.

(56) References Cited

U.S. PATENT DOCUMENTS 5,412,787 A * 5/1995 Forsyth ............... G06F 12/1027
711/207
5,835,962 A * 11/1998 Chang ................. G06F 12/1027
711/206

(Continued)

OTHER PUBLICATIONS

International Search Report of PCT/JP2015/052313 dated Apr. 21, 2015.

*Primary Examiner* — Mano Padmanabhan
*Assistant Examiner* — William E. Baughman
(74) *Attorney, Agent, or Firm* — Mattingly & Malur, PC

(57) ABSTRACT

The processor provides a host computer with a logical volume based on a physical storage device. Based on a command from the host computer, the control device writes, into a memory, address information that associates a logical address in the logical volume with a device address in the physical storage device. The control device receives a command from the host computer and if it is determined that the command is a read command, identifies a first logical address designated by the command and determines whether or not the first logical address is included in the address information. If the first address is included in the address information, the control device specifies a first device address corresponding to the first logical address, reads read data stored in an area indicated by the first device address, and transmits the read data to the host computer.

15 Claims, 18 Drawing Sheets

(52) U.S. Cl.
CPC ........... *G06F 2212/7201* (2013.01); *G06F 2212/7202* (2013.01)

(56) References Cited

U.S. PATENT DOCUMENTS

| | | | | |
|---|---|---|---|---|
| 6,138,225 A | * | 10/2000 | Upton | G06F 12/1027 711/128 |
| 6,470,437 B1 | * | 10/2002 | Lyon | G06F 12/0891 711/144 |
| 2010/0325358 A1 | * | 12/2010 | Meyer | G06F 12/1027 711/122 |
| 2013/0145088 A1 | | 6/2013 | Frost et al. | |
| 2013/0212319 A1 | * | 8/2013 | Hida | G06F 12/0246 711/103 |
| 2014/0173244 A1 | * | 6/2014 | Thompson | G06F 12/1027 711/207 |

* cited by examiner

STORAGE APPARATUS, COMPUTER SYSTEM, AND METHOD FOR IMPROVED READ OPERATION HANDLING

TECHNICAL FIELD

The present invention relates to a storage apparatus.

BACKGROUND ART

Generally, a storage apparatus includes a randomly accessible non-volatile storage medium and a storage controller which controls data transfer between a host computer coupled to the storage apparatus and the non-volatile storage medium inside the storage apparatus.

Examples of a non-volatile storage medium included in a storage apparatus include a hard disk drive (HDD), a magnetic disk drive, an optical disk drive, and a flash drive (a non-volatile semiconductor memory). Performances of these non-volatile storage media are improving year after year. In particular, a storage apparatus including a flash drive is superior to a storage apparatus only including a hard disk drive in terms of lifetime, power saving, access time, and the like. Performances of flash drives are improving dramatically with advances in semiconductor technology.

However, on the other hand, performances of storage controllers are lagging behind and may problematically constitute a bottleneck. Even when mounting, for example, only about a dozen of flash drives, the performance of a storage controller may constitute a bottleneck and prevent the performances of the flash drives from being fully exploited.

PTL 1 discloses a method of realizing, with dedicated hardware, a high-performance storage controller for controlling a storage apparatus.

CITATION LIST

Patent Literature

[PTL 1]
US Patent Application Publication No. 2013/0145088 (Specification)

SUMMARY OF INVENTION

Technical Problem

The technique according to PTL 1 enables the performance of a storage controller to be improved. However, since processing is performed by dedicated hardware, there is a problem that functions for facilitating management of storage apparatuses and improving utilization efficiency of storage apparatuses cannot be provided in a sufficient manner. Examples of functions for facilitating management of storage apparatuses include thin provisioning, volume replication, and snapshot. In addition, examples of functions for improving utilization efficiency of storage apparatuses include deduplication and data compression. In order to provide these functions, a program including the functions must be executed on a processor.

In consideration thereof, the present invention uses both a processor and a control device (for example, dedicated hardware) to improve processing performance with respect to a physical storage device (for example, a non-volatile storage medium) while providing a high-performance storage apparatus. A part of command processing (for example, a write command process) is executed by the processor, and at least a part of a read command process is made executable by the control device without involving the processor in order to improve I/O performance.

Solution to Problem

A storage apparatus includes: a controller coupled to a host computer; and a physical storage device coupled to the controller. The controller includes: a processor configured to provide the host computer with a logical volume based on the physical storage device; a first memory coupled to the processor; a control device coupled to the host computer, the physical storage device, and the processor; and a second memory coupled to the control device. Based on a command from the host computer, the control device is configured to write, into the second memory, address information that associates a logical address in the logical volume with a device address, which is an address in the physical storage device. Upon receiving a command from the host computer, the control device determines whether or not the command is a read command. When it is determined that the command is a read command, the control device identifies a first logical address designated by the command and determines whether or not the first logical address is included in the address information. When a first address is included in the address information, the control device specifies a first device address corresponding to the first logical address, reads read data stored in an area indicated by the first device address, and transmits the read data to the host computer. When the first logical address is not included in the address information, the control device transmits the command to the processor. When it is determined that the command is a command other than a read command, the control device transmits the command to the processor. The processor is configured to execute a process designated by the command received from the control device.

Advantageous Effects of Invention

The storage apparatus according to the present invention is capable of improving processing performance with respect to a physical storage device by executing a part of command processing (for example, a write command process) with a processor and making at least a part of a read command process executable by a control device without involving the processor.

DESCRIPTION OF EMBODIMENTS

In the following description, each piece of information held by a computer system according to each embodiment may be described using expressions such as a table and a list. However, a data structure of each piece of information is not limited and other data structures may be used. Since each piece of information is not dependent on a data structure, for example, a "kkk table" or a "kkk list" can also be referred to as "kkk information".

In addition, in the following description, a processor executes a program and performs a process using, for example, a storage resource (such as a memory) and/or a communication interface device (such as a communication port). While various programs are sometimes considered processing entities in the following description, alternatively, a processor executing the programs may be considered a processing entity. Furthermore, a process with a processor as its processing entity can be interpreted to be performed by executing one or more programs. While a processor is typically a microprocessor such as a CPU (Central Processing Unit), the processor may include a hardware circuit which executes a part of a process (for example, encoding/decoding and compression/expansion).

In addition, in the following description, a storage apparatus (a storage system) includes: one or more physical storage devices; and a controller which controls the physical storage devices. The controller provides a host computer with a logical volume based on the one or more physical storage devices. The logical volume may be a real logical volume or a virtual logical volume. A real logical volume is a logical volume based on the one or more physical storage devices included in the storage apparatus. Examples of a virtual logical volume may include a TP (thin provisioning) logical volume and a snapshot logical volume.

In the following description, a flash drive that is a non-volatile semiconductor memory will be used as an example of a physical storage device. The flash drive is, for example, an SSD (Solid State Drive). Moreover, the physical storage device need only be a non-volatile physical storage device and not necessarily a storage device using a non-volatile semiconductor and, for example, an HDD (Hard Disk Drive) may be used. In addition, a plurality of physical storage devices may constitute one or more RAID (Redundant Array of Independent (or Inexpensive) Disks) groups (a RAID group may also be referred to as a parity group).

Furthermore, in the following description, when describing elements of a same type without distinguishing the elements from one another, reference signs will be used. However, when describing elements of a same type by distinguishing the elements from one another, identifiers (for example, at least one of numerals and characters) assigned to the elements may be used in place of reference signs of the elements.

Embodiment 1

Hereinafter, Embodiment 1 will be described.

Figure 1:
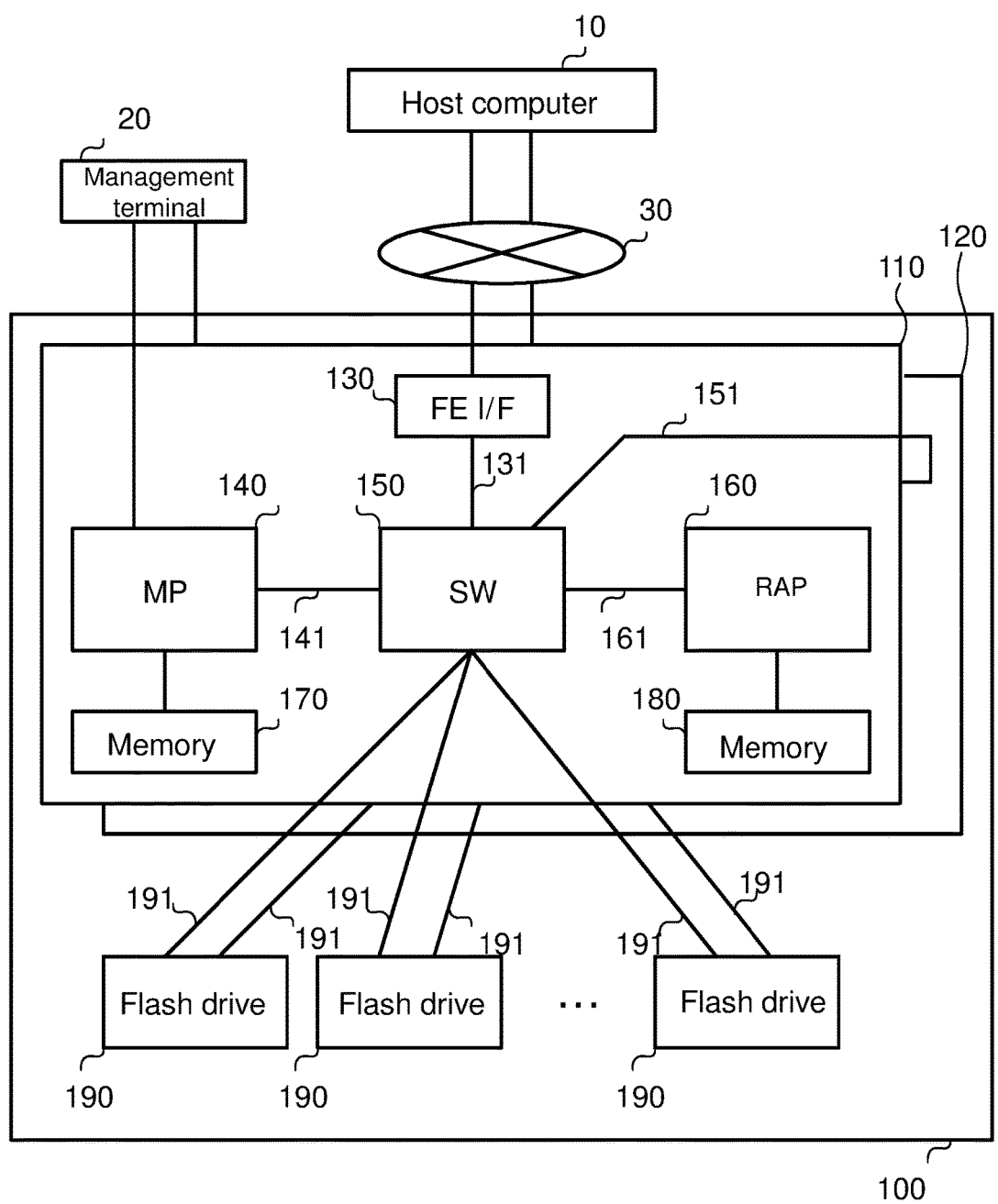
FIG. 1 is a configuration diagram of a computer system according to Embodiment 1.

FIG. 1 is a configuration diagram of a computer system according to the Embodiment 1.

The computer system includes a host computer 10, a management terminal 20, and a storage apparatus 100. Hereinafter, the host computer 10 may be simply referred to as a host 10.

The host 10 is coupled to the storage apparatus 100 via a network 30. The network 30 is a communication path for exchanging commands and data between the host 10 and the storage apparatus 100 and is constituted by, for example, a SAN (Storage Area Network).

The storage apparatus 100 includes: storage controllers 110 and 120; and one or more flash drives 190 which are physical storage devices (non-volatile storage media). In the following description and in the drawings, the storage controllers 110 and 120 may be simply referred to as a controller and the flash drives 190 may be simply referred to as a drive 190.

The controllers 110 and 120 are made redundant in FIG. 1. However, the number of controllers is not limited to two and one or three or more controllers may be provided. Moreover, the controller 110 and the controller 120 basically share a same configuration. Therefore, unless otherwise necessary, a description of the controller 120 will be hereinafter omitted.

The controller 110 includes: a frontend interface 130; a processor 140; a read accelerator processor 160; memories 170 and 180; and a switch (SW) 150. In the following description and in the drawings, the frontend interface 130 may be may be abbreviated as FE I/F 130, the processor 140 as MP (Microprocessor) 140, and the read accelerator processor 160 as RAP 160. The RAP 160 is a control device and may be realized by, for example, dedicated hardware such as an ASIC (application specific integrated circuit) or an FPGA (field-programmable gate array). For example, processes described later to be executed by the RAP 160 can be processed with higher performance (at a higher speed) when executed by the RAP 160 mounted as hardware than when executed by the MP (Microprocessor) 140.

The switch 150 is coupled to the FE I/F 130 via a signal line 131, coupled to the MP 140 via a signal line 141, coupled to the RAP 160 via a signal line 161, and coupled to the drive 190 via a signal line 191. For example, each of the signal lines 131, 141, 151, 161, and 191 is, but not limited to, a PCI Express bus to be used as an internal data transfer path of the controller. In addition, for example, the MP 140 and the RAP 160 are coupled via a Non Transparent Bridge and are capable of communicating with each other. However, the coupling between the MP 140 and the RAP 160 is not limited to a Non Transparent Bridge.

The switch 150 of the controller 110 and a switch (not shown) of the controller 120 are coupled to each other via the signal line 151. Accordingly, the MP 140 in the controller 110 and a processor (not shown) in the controller 120 are capable of communicating with each other.

The memory 170 is coupled to the MP 140. The memory 170 is a main storage medium of the MP 140 and includes: an area for storing programs (a storage control program and the like) to be executed by the MP 140 and a management table to be referenced by the MP; and a cache area for temporarily storing data. Details will be provided later.

The memory 180 is coupled to the RAP 160. The memory 180 is a main storage medium of the RAP 160 and includes an area for storing a management table to be referenced by the RAP 160 and the like. Details will be provided later.

The FE I/F 130 is coupled to the host 10 via the network 30. The FE I/F 130 converts a data transfer protocol between the host 10 and the controller 110 into a data transfer protocol inside the controller 110 and vice versa.

The MP 140 of the controller 110 provides the host 10 with a logical volume (LU: Logical Unit) based on one or a plurality of drives 190. Hereinafter, an LU will be described as a virtual logical volume.

The management terminal 20 is respectively coupled to the controllers 110 and 120. The management terminal 20 includes: an input apparatus to be used by a manager of the storage apparatus 100 to input configuration information to each of the controllers 110 and 120; and a display apparatus for displaying information on the storage apparatus 100 to the manager.

Figure 2:
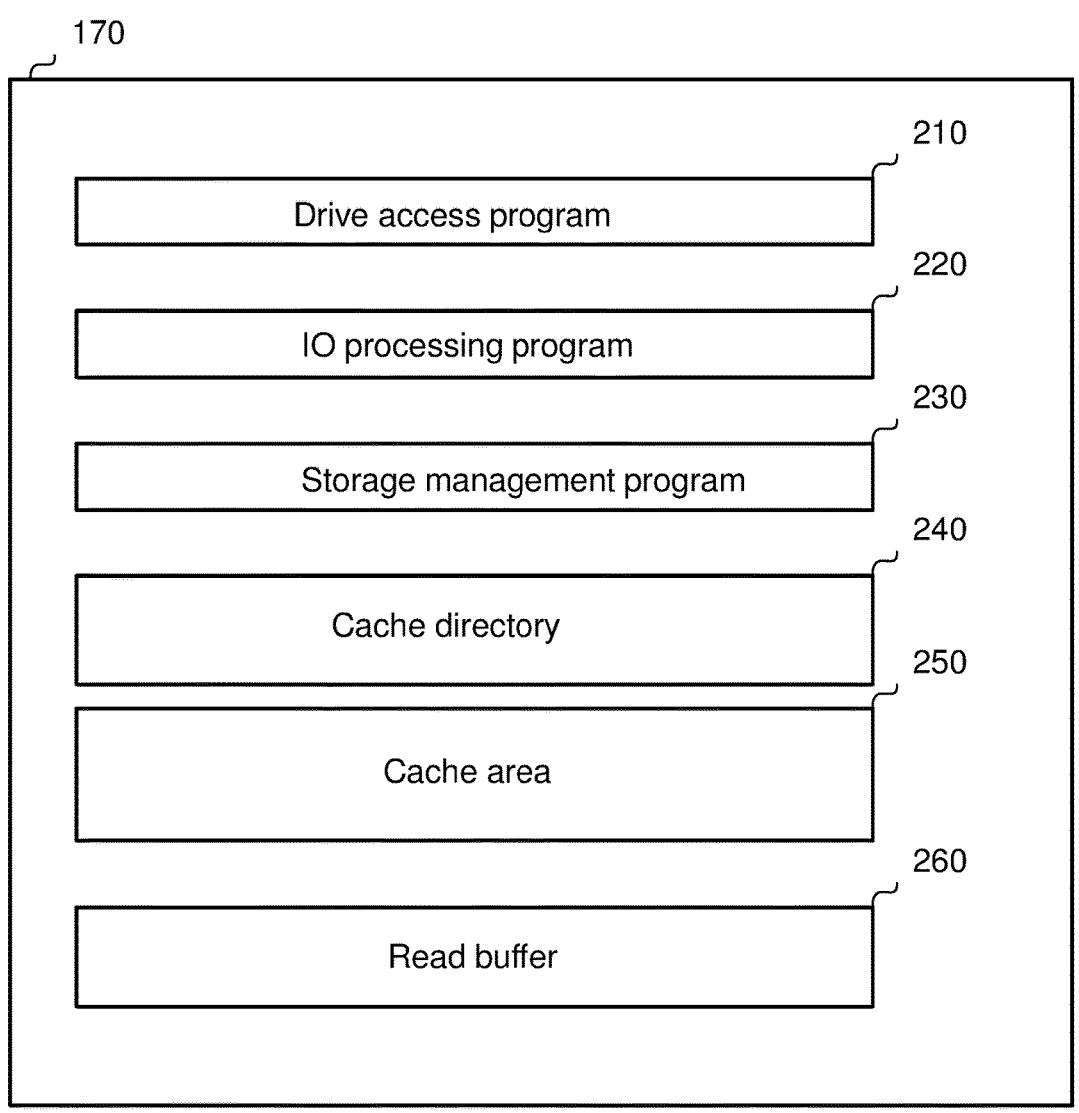
FIG. 2 shows a configuration of a memory 170 of an MP 140.

FIG. 2 shows a configuration of the memory 170 for the MP 140.

The memory 170 includes a drive access program 210, an IO processing program 220, a storage management program 230, a cache directory 240, a cache area 250, and a read buffer 260.

The drive access program 210 performs control for transferring (staging) data stored in the drive 190 to the cache area 250, control for storing (destaging) data in the cache area 250 in the drive 190, and the like. The IO processing program 220 processes commands such as a read command, a write command, and a management command, and returns a response to each command. The storage management program 230 is, for example, a program that provides functions for facilitating management, improving utilization efficiency, and the like of the storage apparatus 100 and provides, for example, functions such as thin provisioning, volume replication, snapshot, deduplication, and data compression. The read buffer 260 is an area for temporarily storing data when the MP 140 transfers data in the drive 190 to the FE I/F 130. The cache directory 240 is information used by the MP 140 when retrieving data (cache data) stored in the cache area 250.

The cache directory 240 includes reference tables GRPP (GRouP Pointer), GRPT (GRouP Table) 1, GRPT2, and a slot control block (SLCB) as a management table. The reference tables (GRPP, GRPT1, and GRPT2) are tables referenced by the MP 140 when retrieving a cache segment (hereinafter, a segment) which is a minimum unit in the cache area 250. The reference tables have a directory structure. The GRPP is positioned uppermost and the GRPT2 is positioned lowermost. An upper-level reference table contains a pointer to a next reference table. For example, the GRPT2 contains a pointer to the SLCB. The SLCB is a table for managing control information related to a segment.

The SLCB stores information indicating whether or not data designated by a read command is stored in the cache area 250 and, when the data is stored in the cache area 250, an address (a cache address) of the data on the memory 170, and the like. One or a plurality of segments can be associated with one slot. For example, one segment is capable of storing 64 KB of data.

Moreover, while a segment has been described as a minimum unit for managing the cache area 250, alternatively, the cache area 250 may be managed in slot units. A transition between states of dirty data and clean data may be performed in slot units. The cache area 250 may be reserved and released in either slot units or segment units.

In this case, dirty data refers to data stored in the cache area 250 in a state prior to being written into the drive 190. On the other hand, clean data refers to data stored in the cache area 250 in a state after being written into the drive 190.

When the MP 140 receives a read command from the host 10, based on an LU number (LUN: Logical Unit Number) and a logical block address (LBA: Logical Block Address) contained in the read command, the MP 140 sequentially searches the respective tables in the cache directory 240. Accordingly, the MP 140 is able to find out whether or not read data designated by the read command is stored in the cache area 250 and, when stored, an address (a cache address) of the read data on the cache area 250. Moreover, since data retrieval in the cache area 250 using the cache directory 240 is well-known art, a detailed description thereof will be omitted herein.

Figure 3:
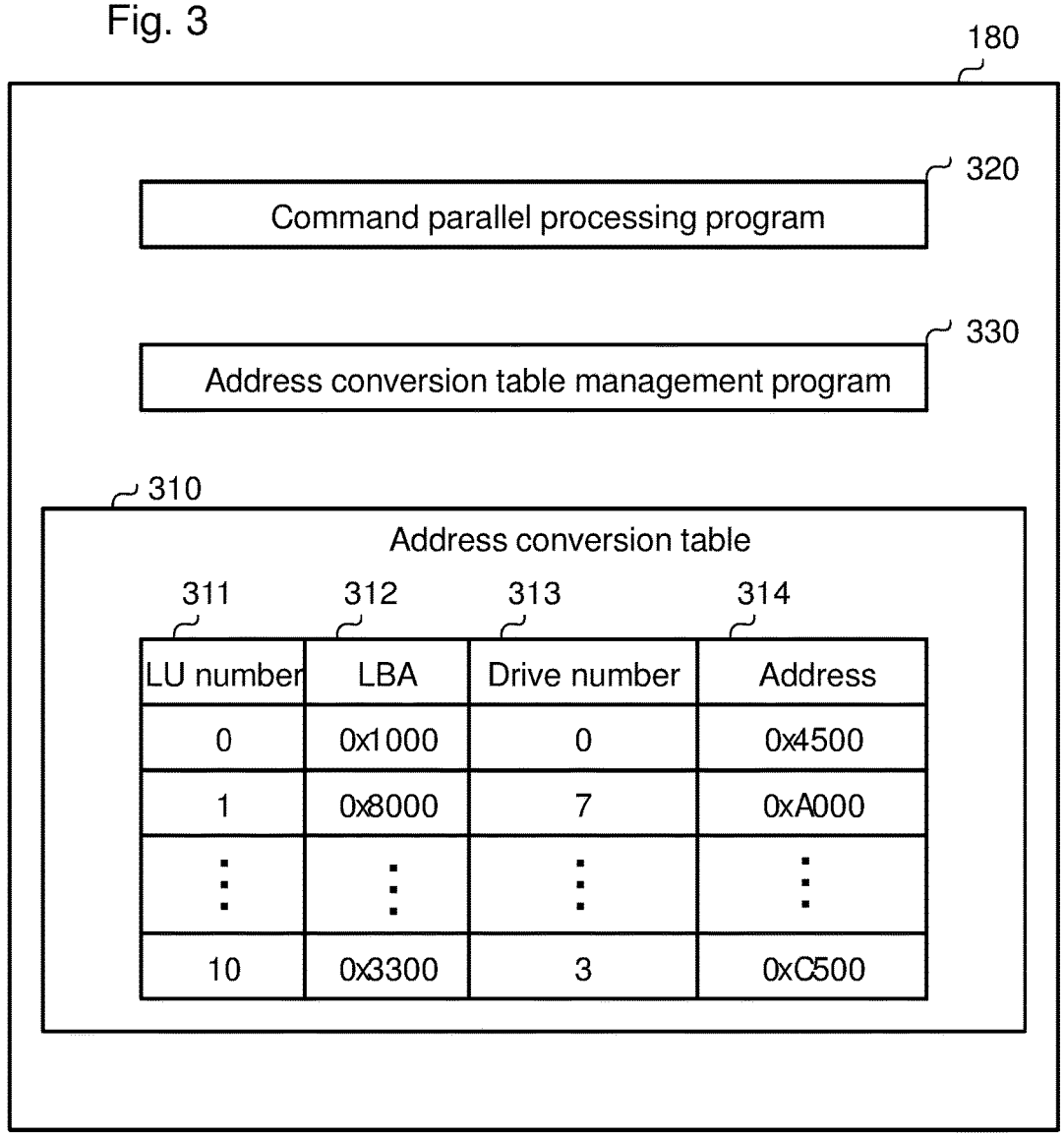
FIG. 3 shows a configuration of a memory 180 of a RAP 160.

FIG. 3 shows a configuration of the memory 180 for the RAP 160.

The memory 180 includes a command parallel processing program 320, an address conversion table management program 330, and an address conversion table 310. Alternatively, the address conversion table 310 may be stored in the memory 170.

The command parallel processing program 320 and the address conversion table management program 330 are programs to be executed by the RAP 160. The command parallel processing program 320 processes commands received by the controllers 110 and 120. Details of this process will be described later. The address conversion table management program 330 performs a registration process of the address conversion table 310 in accordance with an instruction from the MP 140. In addition, the address conversion table management program 330 performs a registration process or a registration deletion process of the address conversion table 310 in accordance with an instruction from the command parallel processing program 320.

The address conversion table 310 is a table which directly associates an LBA of an LU provided by the controllers 110 and 120 to the host 10 and an address (a device address) of a data block in the drive 190 with each other. The device address is an address provided by the drive 190 to the controllers 110 and 120. Each entry of the address conversion table 310 includes items of, for example, an LU number 311 of an LU, an LBA 312 of the LU, a drive number 313 of the drive 190, and an address 314 of a data block in the drive 190. A set of the LU number 311 and the LBA 312 and a set of the drive number 313 and the address 314 each have unique values. In order to reduce the size of the address conversion table 310, the controllers 110 and 120 may manage the LBA 312 using a plurality of consecutive LBAs as one management unit. Specifically, for example, the controllers 110 and 120 manage the LBA 312 in a same unit as a slot of the cache area 250. In addition, in order to facilitate management of the address conversion table 310, a configuration may be adopted in which a corresponding management unit is identified by high-order bits of an LBA in a range determined in advance and an LBA in the management unit is identified by low-order bits of an LBA in a range determined in advance. Supposing that the management unit is 128 logical blocks, a first LBA (with 0 as lowest 7 bits) of the management unit is registered in the LBA 312. When performing address conversion, the address conversion table 310 is searched using a LU number and a value in which the lowest 7 bits of an LBA are masked by 0 as a search key to obtain a drive number and a data block address of a drive corresponding to the management unit. Furthermore, when the LBA 312 is managed in a same unit as a slot of the cache area 250 as described above, a corresponding slot number may be stored and managed in the LBA 312 in place of an LBA. In this case, an LU number and the corresponding slot number are to be used as a search key for address conversion. Details of timings at which registration and registration deletion of the address conversion table 310 are performed will be provided later.

Hereinafter, details of the RAP 160 will be described.

Figure 4:
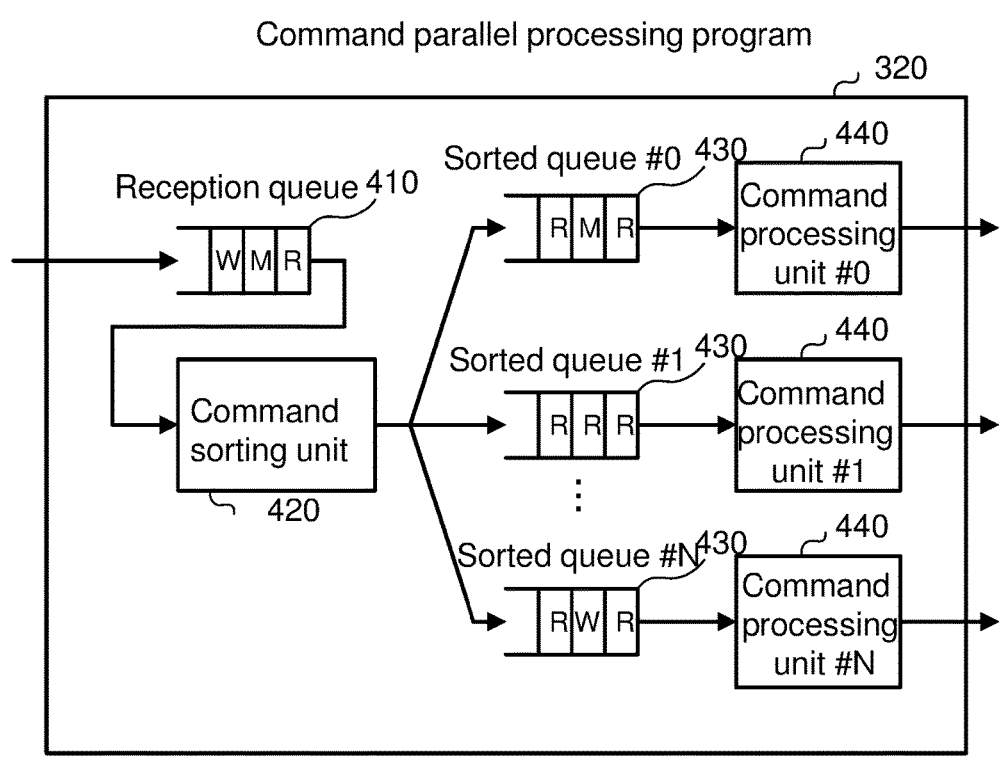
FIG. 4 is a functional block diagram for explaining a command parallel processing program 320.

FIG. 4 is a functional block diagram for explaining the command parallel processing program 320.

The command parallel processing program 320 includes a reception queue 410, a command sorting unit 420, a plurality of sorted queues 430 (sorted queue #0 to sorted queue #N), and a plurality of command processing units 440 (command processing unit #0 to command processing unit #N).

The command parallel processing program 320 enqueues a command received by the FE I/F 130 from the host 10 to a tail end of the reception queue 410. Examples of a command type of a command received by the controllers 110 and 120 from the host 10 include a read command, a write command, and a management command. While it is assumed that the controllers 110 and 120 receive commands of these three types in the following description, the controllers 110 and 120 may receive commands of other types. Moreover, in the following description and in the drawings, a read command may be denoted by "R", a write command may be denoted by "W", and a management command may be denoted by "M".

The command sorting unit 420 dequeues a command from a head of the reception queue 410 and enqueues the command to a tail end of one sorted queue 430 that satisfies conditions. Specifically, the command sorting unit 420 sorts commands that can be processed in parallel into different sorted queues 430 and sorts commands that cannot be processed in parallel into a same sorted queue 430. Commands that are sorted into the same sorted queue 430 are, for example, commands in an order relationship. For example, when a read command designating an arbitrary set of an LU number and an LBA is dequeued and, subsequently, a write command designating the same set of an LU number and an LBA is consecutively dequeued, the command sorting unit 420 sorts these commands into the same sorted queue 430.

When these commands are processed in parallel, there is a possibility that the write command may be processed before the read command. For example, after the MP 140 executes a write process based on the write command and transmits a completion response thereof to the host 10, data prior to update having been read before the write process may be inadvertently transmitted as read data to the host. In order to prevent such operations that are contradictory to the order relationship of the command, a read command and a write command designating a same set of an LU number and an LBA must be processed in series instead of in parallel.

Each sorted queue 430 has a one-to-one correspondence with the command processing unit 440. Each command processing unit 440 dequeues a command from a head of the sorted queue 430 corresponding to the command processing unit 440 and processes the command according to rules. An example of the rules of command processing in the command processing unit 440 will be described. For example, the following three rules are applied: (1) when processing a read command, a command other than a read command is not newly processed; (2) commands other than read commands are processed sequentially (prohibition of simultaneous processing of plurality of commands); and (3) when processing a command other than a read command, a read command is not newly processed. In other words, according to these rules, while each command processing unit 440 is capable of parallel processing of a plurality of read commands, commands other than read commands such as a write command and a management command must always be processed one at a time. The parallel processing of read commands enables read commands to be processed at high speed.

Figure 5:
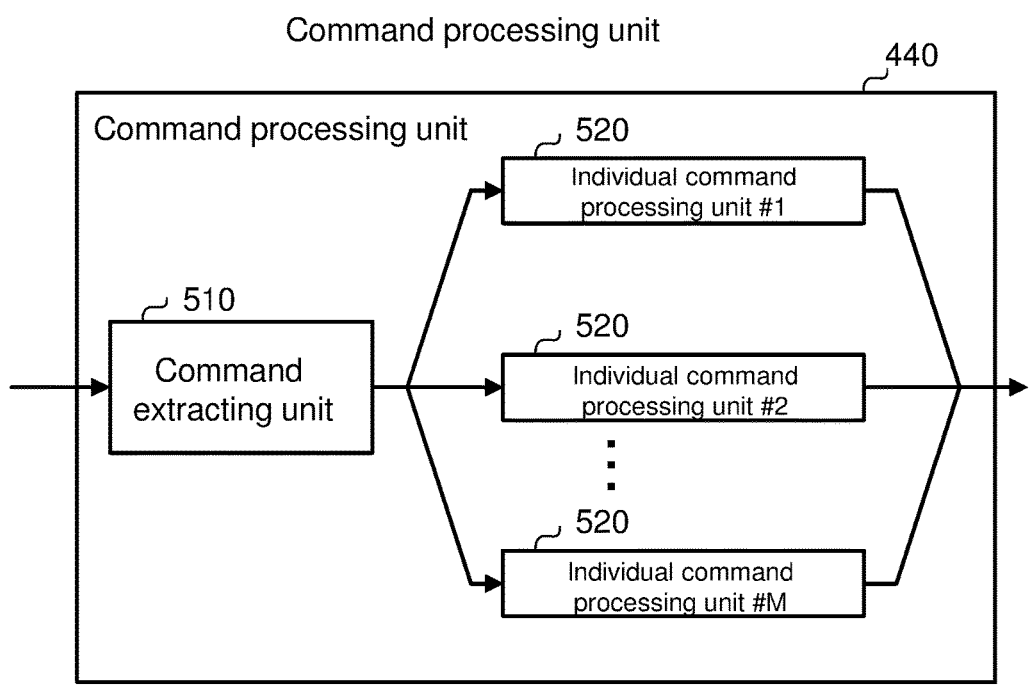
FIG. 5 is a functional block diagram for explaining a command processing unit 440.

FIG. 5 is a functional block diagram for explaining the command processing unit 440.

The command processing unit 440 includes a command extracting unit 510 and a plurality of individual command processing units 520 (individual command processing unit #1 to individual command processing unit #M). The command extracting unit 510 extracts one command from a head of the sorted queue 430 in accordance with the rules described above and hands over the extracted command to a single idling individual command processing unit 520. A maximum number of commands that can be processed by the individual command processing unit 520 at one time is one. Moreover, in the description of the present specification, a state where the individual command processing unit 520 is executing a command will be referred to as "executing" and a state where the individual command processing unit 520 is not executing a command will be referred to as "idling".

Hereinafter, each process by the RAP 160 will be described. In the following description, a step will be simply abbreviated as "S".

Figure 6:
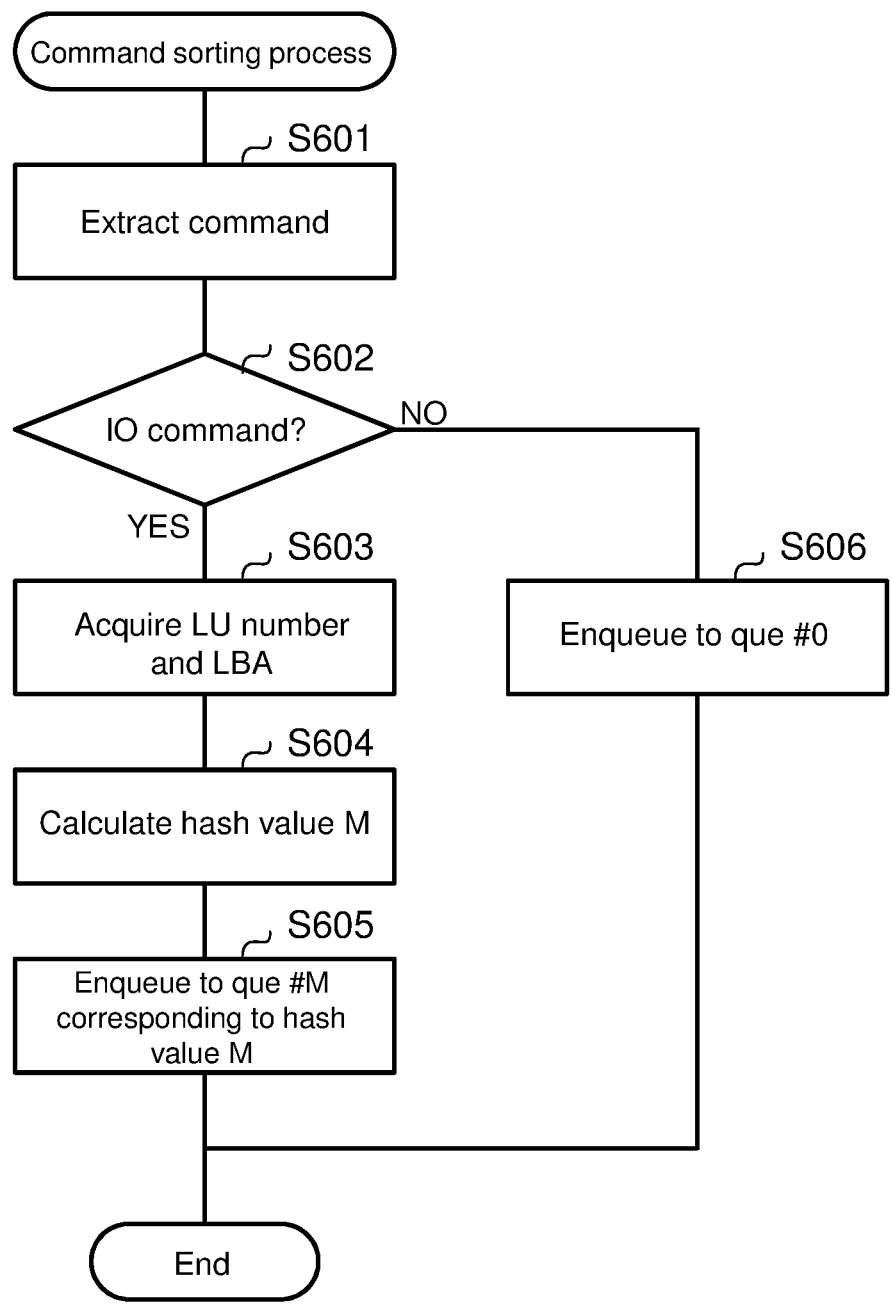
FIG. 6 shows an example of a flow chart of a command sorting process.

FIG. 6 shows an example of a flow chart of a command sorting process. The command sorting process is a process executed by the command sorting unit 420.

In S601, the command sorting unit 420 dequeues one command from the head of the reception queue 410.

In S602, the command sorting unit 420 determines a command type of the extracted command. Specifically, for example, when a read command and a write command are considered IO commands, the command sorting unit 420 determines whether or not the extracted command is an IO command. An example of a command other than an IO command is a management command.

When the extracted command is an IO command (Yes in S602), the command sorting unit 420 advances the process to S603. On the other hand, when the extracted command is a management command (No in S602), the command sorting unit 420 advances the process to S606.

In S603, the command sorting unit 420 acquires a set of an LU number and an LBA designated by the extracted command.

In S604, the command sorting unit 420 calculates a hash value M from the acquired set of an LU number and an LBA.

In S605, the command sorting unit 420 enqueues a command to a tail end of a sorted queue 430 corresponding to the hash value M and ends the process. Moreover, as an example of an association between a hash value and a sorted queue 430, for example, a hash value M and a sorted queue #M having a same number as the hash value M may be associated with each other. A hash value and a sorted queue 430 may be associated with each other in any way. At this point, in order to sort commands which designate an LBA in a range determined in advance into a same sorted queue 430, the hash value M may be calculated after performing a conversion which, for example, masks a part of the bits of the LBA with 0. The range described above is, for example, a management unit of the address conversion table 310.

In S606, for example, the command sorting unit 420 enqueues a command to a tail end of the sorted queue #0 and ends the process. In this case, the command sorting unit 420 uses the sorted queue #0 as a sorted queue for processing a management command.

According to the command sorting process, a command of a reception queue can be sorted into sorted queues 430 in accordance with rules. In addition, a management command can be sorted into one sorted queue 430 determined in advance. Since a plurality of management commands cannot implement simultaneous processing, having only a command processing unit 440 corresponding to a sorted queue determined in advance execute a management command prevents processing performance of other command processing units 440 from declining. In addition, an IO command is sorted into a sorted queue corresponding to the hash value M corresponding to a set of an LU number and an LBA. Accordingly, since a read command and a write command which share a same storage destination are sorted into a same sorted queue, processing of IO commands can be performed in an order in which the IO commands are received.

Figure 7:
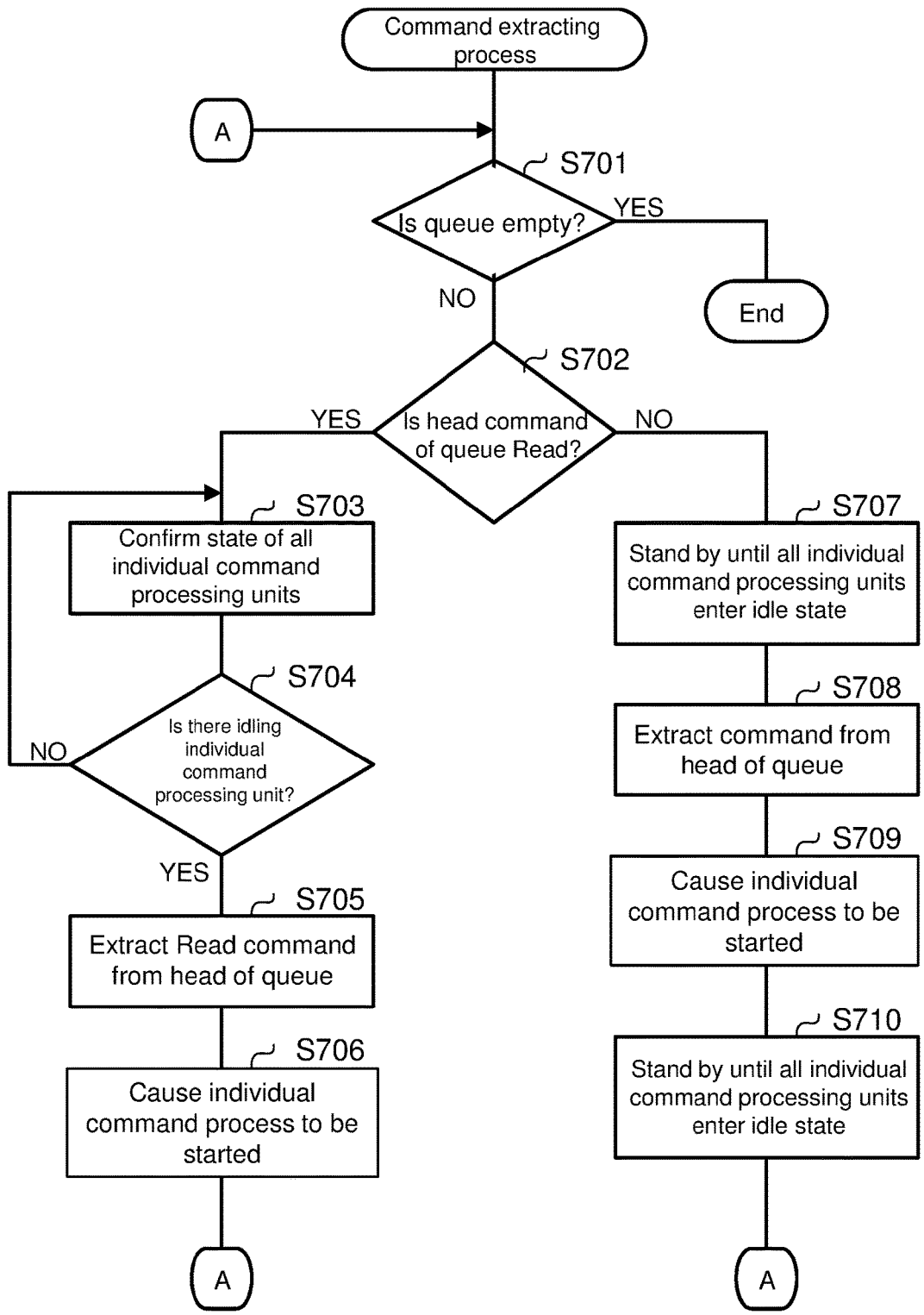
FIG. 7 shows an example of a flow chart of a command extracting process.

FIG. 7 shows an example of a flow chart of a command extracting process. The command extracting process is a process executed by each command extracting unit 510. A process executed by the command extracting unit 510 of the command processing unit #0 will now be described as an example.

In S701, the command extracting unit 510 determines whether or not the sorted queue 430 is empty. When the sorted queue 430 is empty (Yes in S701), the command extracting unit 510 ends the process. On the other hand, when the sorted queue 430 is not empty (No in S701), the command extracting unit 510 advances the process to S702.

In S702, the command extracting unit 510 determines whether a command type of a head command of the sorted queue 430 is a read command or a command of another type. When the head command is a read command (Yes in S702), the command extracting unit 510 advances the process to S703.

In S703, the command extracting unit 510 confirms a state of all individual command processing units 520 in the command processing unit 440.

In S704, the command extracting unit 510 determines whether or not there is even one idling individual command processing unit 520. When there is no idling individual command processing unit 520 (No in S704), the command extracting unit 510 returns the process to S703. On the other hand, when there is even one idling individual command processing unit 520 (Yes in S704), the command extracting unit 510 advances the process to S705.

In S705, the command extracting unit 510 dequeues a read command from the head of the sorted queue 430.

In S706, the command extracting unit 510 hands over the extracted command to one idling individual command processing unit 520 and causes the individual command processing unit 520 to start an individual command process. After S706, the command extracting unit 510 returns the process to S701.

In S702, when the head command is a command other than a read command (No) or, in other words, when the head command is a write command or a management command, the command extracting unit 510 advances the process to S707.

In S707, the command extracting unit 510 stands by until all individual command processing units 520 in the command processing unit 440 enter an idle state.

In S708, the command extracting unit 510 dequeues one command from the head of the sorted queue 430.

In S709, the command extracting unit 510 hands over the extracted command to one of the idling individual command processing units 520 and causes the individual command processing unit 520 to start an individual command process.

In S710, the command extracting unit 510 stands by until all individual command processing units 520 in the command processing unit 440 enter an idle state (in other words, until all executing individual command processing units 520 end their processes), and returns the process to S701.

According to the command extracting process, the command processing unit 440 can perform processing in accordance with rules. Specifically, when a command at the head of a sorted queue 430 is a read command and there is even one individual command processing unit 520 in an idle state among the plurality of individual command processing units 520 in the command processing unit 440 to which the command extracting unit 510 belongs, the command extracting unit 510 can hand over the read command to the individual command processing unit 520 in an idle state and cause the individual command processing unit 520 to execute an individual command process. Accordingly, read commands can be processed in parallel in the command processing unit 440. Therefore, read commands can be executed in an efficient manner.

When a command at the head of a sorted queue 430 is a command other than a read command and all of the individual command processing units 520 in the command processing unit 440 to which the command extracting unit 510 belongs are in an idle state, the command extracting unit 510 can hand over the command other than a read command to one of the individual command processing units 520 and cause the individual command processing unit 520 to execute an individual command process. Accordingly, conditions of rule (1) can be satisfied. Even in the command processing unit 440, commands other than a read command such as a write command and a management command can be processed exclusively from other commands.

In addition, when a command other than a read command is being executed by one individual command processing unit 520 in the command processing unit 440 to which the command extracting unit 510 belongs, the command extracting unit 510 does not extract a next command until the individual command process is finished. Accordingly, conditions of rules (2) and (3) can be satisfied. In other words, with respect to commands that are either management commands or write commands, one command is to be exclusively processed in the command processing unit 440.

Furthermore, a correspondence between an LBA and a device address in the drive 190 may be changed, and unless the change is appropriately reflected in the address conversion table 310 in the memory 180, the RAP 160 may inadvertently return data stored at the device address prior to the change to the host. According to the processes described above, even when such a change is made, the MP 140 and the RAP 160 can be operated without any logical contradictions.

Figure 8:
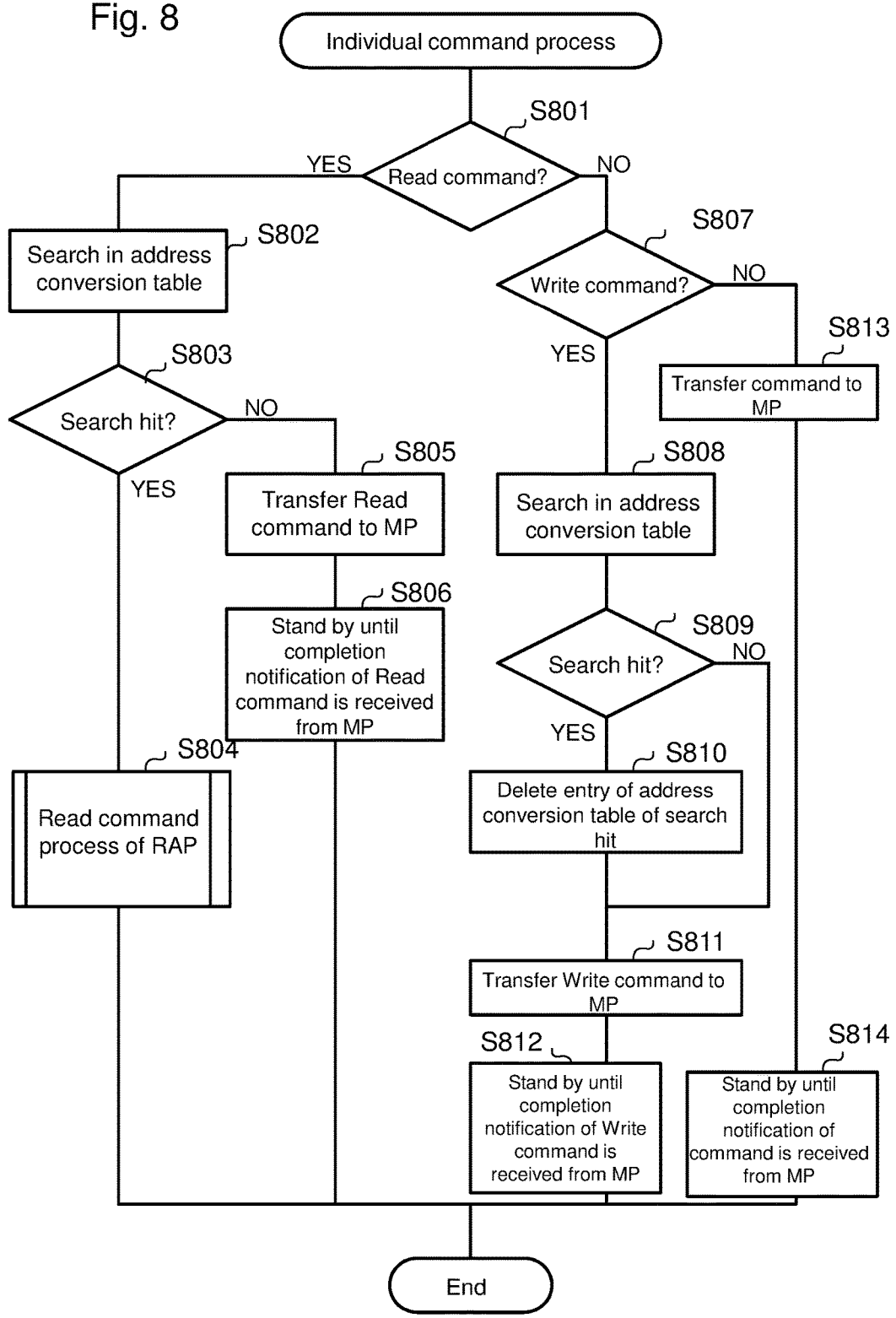
FIG. 8 shows an example of a flow chart of an individual command process.

FIG. 8 shows an example of a flow chart of an individual command process.

The individual command process is a process executed by each individual command processing unit 520. A process executed by one individual command processing unit 520 in the command processing unit #0 will now be described as an example.

In S801, the individual command processing unit 520 determines whether a command type of a command received from the command extracting unit 510 is a read command or a command other than a read command. When the received command is a read command (Yes in S801), the individual command processing unit 520 advances the process to S802. On the other hand, when the received command is a command other than a read command (No in S801) such as a write command or a management command, the individual command processing unit 520 advances the process to S807.

In S802, the individual command processing unit 520 searches the address conversion table 310 using a set of an LU number and an LBA designated by the read command as a search key. In this case, the set of an LU number and an LBA may be expressed by the hash value described earlier. Moreover, a method of designating a search key in accordance with a management method of the address conversion table 310 is as described earlier.

Figure 9:
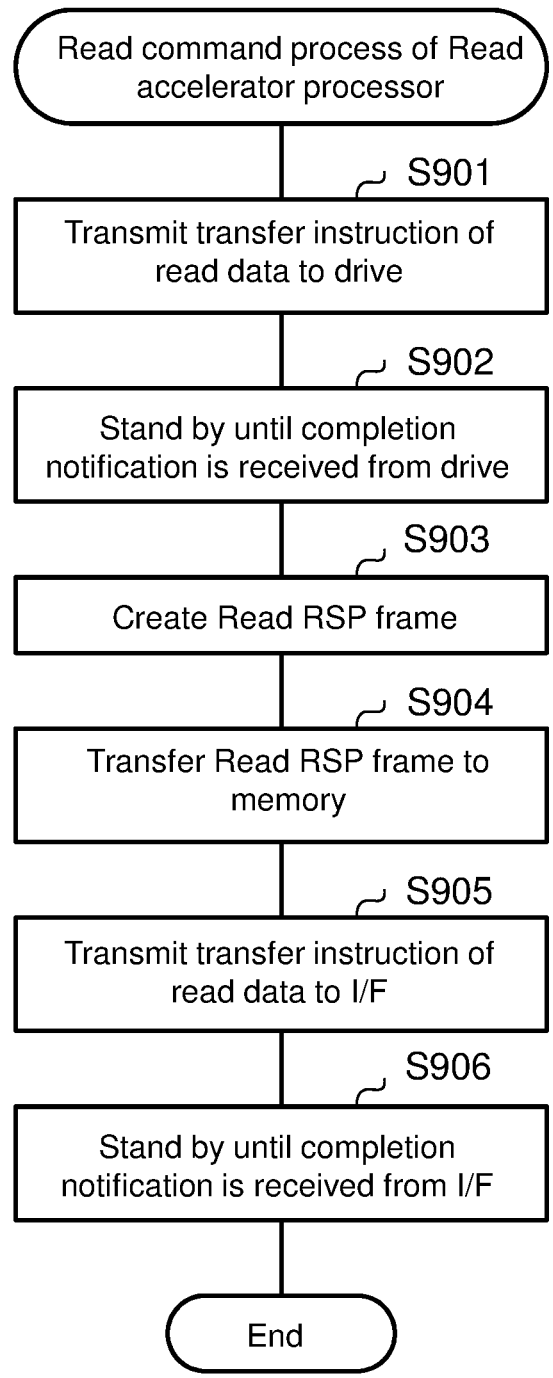
FIG. 9 shows an example of a flow chart of a read command process executed by the RAP 160.
Figure 10:
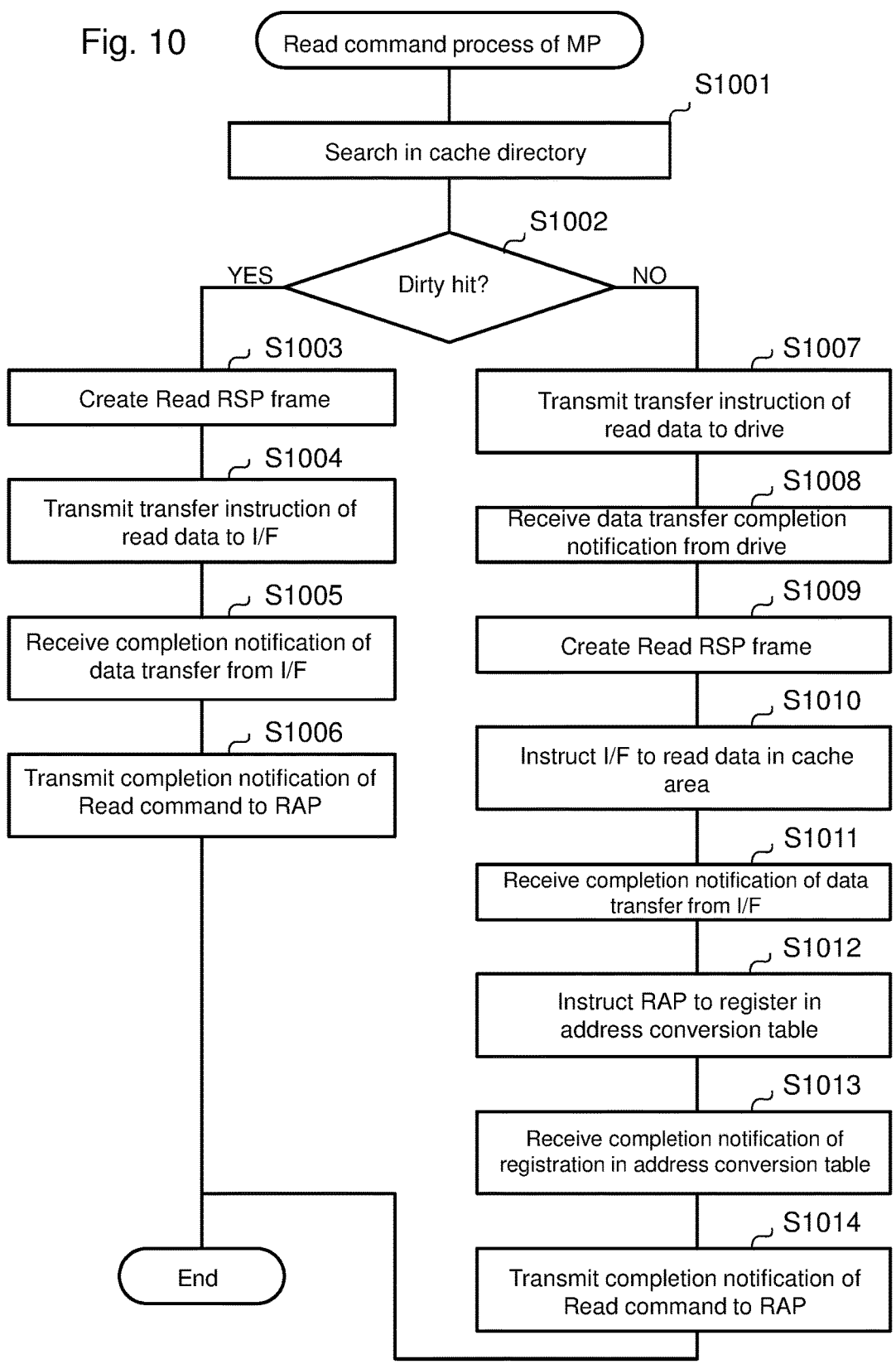
FIG. 10 shows an example of a flow chart of a read command process executed by the MP 140.

In S803, the individual command processing unit 520 determines whether or not the search in S802 results in a hit. When the search results in a hit (Yes in S803), the individual command processing unit 520 advances the process to S804. When the search results in a hit (Yes in S803), there is a state where, with respect to data stored in the LU number and the LBA designated by the read command, dirty data due to a write command preceding the read command does not exist in the cache area 250. On the other hand, when the search does not result in a hit (No in S803), the individual command processing unit 520 advances the process to S805. In this case, when the search does not result in a hit (No in S803), there is a possibility that, with respect to data stored in the LU number and the LBA designated by the read command, dirty data due to a write command preceding the read command exists in the cache area 250. In order to prevent data stored at a device address prior to reflecting the dirty data from being read by a read command transmitted from the host 10 after the write command, a read command process (FIG. 10) is executed by the MP 140 as will be described later. In the present embodiment, in processing of a write command, when an entry of a set of an LU number and an LBA designated by the write command is registered in the address conversion table 310, the entry is deleted from the address conversion table 310 (S810) and, in a read command process, when dirty data does not exist in the cache area 250 (in a case other than a dirty hit), a set of an LU number and an LBA designated by the read command is registered in the address conversion table 310. In addition, the address conversion table 310 is searched upon receiving a read command (S802), the RAP 160 or the MP 140 is determined as a processing entity of the read command process based on a search result, and a different read command process is executed depending on a result of the determination of a processing entity as shown in FIG. 9 or 10. Therefore, before data of the drive 190 is updated by write data (dirty data) due to a write command, data prior to the update is prevented from being transmitted to the host 10 as read data by a read command subsequent to the write command.

In S804, the individual command processing unit 520 performs a read command process (FIG. 9) by the RAP 160 and ends the process. Details of the read command process by the RAP 160 will be described later.

In S805, the individual command processing unit 520 causes the MP 140 to execute a read command process by transmitting a read command to the MP 140. Subsequently, in S806, the individual command processing unit 520 stands by until a completion notification of the read command process is received from the MP 140 and then ends the process.

In S807, the individual command processing unit 520 determines whether a command type of a command received from the command extracting unit 510 is a write command or a command other than a write command. When the received command is a write command (Yes in S807), the individual command processing unit 520 advances the process to S808. When the received command is a command other than a write command (No in S807), the individual command processing unit 520 advances the process to S813.

In S808, the individual command processing unit 520 searches the address conversion table 310 using a set of an LU number and an LBA designated by the write command as a search key. Moreover, a method of designating a search key in accordance with a management method of the address conversion table is as described earlier. When a range of write data designated by the write command straddles a plurality of management units of the address conversion table, the process described above is repeated the required number of times to search the address conversion table 310 with respect to the data range designated by the write command.

In S809, the individual command processing unit 520 determines whether or not the search in S808 results in a hit. When the search results in a hit (Yes in S809), the individual command processing unit 520 deletes an entry corresponding to a set of an LU number and an LBA having resulted in the hit from the address conversion table 310 (S810), and advances the process to S811. Moreover, depending on a length of the data designated by the write command, a hit may include a plurality of entries. When the search does not result in a hit (No in S809), the individual command processing unit 520 advances the process to S811.

In S811, the individual command processing unit 520 causes the MP 140 to execute a write command process by transmitting a write command to the MP 140. Subsequently, in S812, the individual command processing unit 520 stands by until a completion notification of the write command process is received from the MP 140, and ends the process after receiving the completion notification.

In S813, the individual command processing unit 520 causes the MP 140 to execute a command process by transmitting a command to the MP 140. An example of this command is a management command. Subsequently, in S814, the individual command processing unit 520 stands by until a completion notification of the command process is received from the MP 140, and ends the process after receiving the completion notification.

When the command processed by the individual command processing unit 520 is a read command and a set of an LU number and an LBA designated by the read command is registered in the address conversion table 310, the RAP 160 can execute a read command process without involving the MP 140. Accordingly, for example, a case where a read command process is executed by the RAP 160 including when the RAP 160 is realized by hardware such as an ASIC or an FPGA enables processing with higher performance (at a higher speed) and improves performances of the controllers 110 and 120 as compared to a case where the read command process is executed by the MP 140. In addition, a part of a read command process executed by the MP 140 can be borne by the RAP 160 to distribute a load applied to the MP 140 by the read command process.

Generally, in a storage apparatus, many virtual or logical volumes may be interposed between a logical volume provided to a host computer and a non-volatile storage medium, in which case a plurality of address conversions may be required to calculate an address of the non-volatile medium storing actual data from an address of a logical volume designated by an IO (Input or Output) command (a read command or a write command) transmitted from the host computer and a performance effect of a processor may not be sufficiently obtained due to an overhead imposed by the conversion process. In the present embodiment, the address conversion table 310 directly associates a data storage position in an LU provided to the host and a data storage position in the drive 190. Accordingly, even when the storage apparatus 100 is equipped with a function unique to storage apparatuses such as virtualization technology and address conversion is required between a data storage position in an LU and a data storage position in the drive 190, a read speed of read data can be increased without having to perform such address conversion.

In particular, in the case of a high-performance storage apparatus using the flash drive 190 as in the present embodiment, by distributing a load imposed by a read command process and configuring the memory 180 of the RAP 160 that is a processor dedicated to read commands so as to include the address conversion table 310, the performance of the storage apparatus 100 can be maintained even when the storage apparatus 100 is equipped with a function unique to the storage apparatus 100.

Supposing that the RAP 160 inquires the MP 140 for an address in the drive 190 corresponding to a set of an LU number and an LBA every time the RAP 160 processes a read command, a load applied by address conversion causes a decline in the performance of the MP 140. In addition, communication between the RAP 160 and the MP 140 consumes processing time and causes a decline in the performance of the storage apparatus. By having the RAP 160 perform address conversion based on the address conversion table 310 without involving the MP 140, the storage apparatus 100 according to the present embodiment is capable of executing a read command process without requiring the RAP 160 and the MP 140 to communicate with each other. On the other hand, when receiving a write command or a management command, the command is transferred by the individual command processing unit 520 to enable the MP 140 to process the command.

Furthermore, by offloading a read command process to the RAP 160, a resource of the MP 140 can be used to process commands other than a read command and performance of the storage apparatus 100 as a whole can be improved.

Due to an individual command process, in processing of a write command, when an entry of a set of an LU number and an LBA designated by the write command is registered in the address conversion table 310 (S810), the entry can be deleted from the address conversion table 310. Accordingly, when data stored in the LU number and the LBA designated by the write command is updated, data prior to the update is prevented from being read by a read command transmitted from the host 10 after the write command.

Moreover, there may be cases where the RAP 160 deletes an entry of the address conversion table 310 other than an individual command process. An example of such a case is when the storage management program 230 running on the MP 140 changes a storage destination of data. In this case, the MP 140 may be configured to output a deletion command of an entry of the address conversion table 310 to the RAP 160. Moreover, examples of a case where a storage destination of data is changed include a case where same data is stored in a plurality of different data blocks of the drive 190. Due to a deduplication process, the MP 140 changes the drive number 313 and the address 314 of a storage destination of data corresponding to an LBA so that a common data block is referenced by the data. Details including a format of the deletion command will be described later.

FIG. 9 shows an example of a flow chart of a read command process executed by the RAP 160.

A read command process of the RAP 160 is executed by the individual command processing unit 520 of the RAP 160. This process is the process of S804 in FIG. 8.

In S901, the individual command processing unit 520 transmits a transfer instruction of read data designated by a read command to a drive storing the read data.

Specifically, for example, the individual command processing unit 520 acquires a set of the drive number 313 and the address 314 corresponding to a set of the LU number 311 and the LBA 312 designated by the read command from the address conversion table 310. In addition, the individual command processing unit 520 writes a transfer parameter indicating a transfer source address of a data block of the address 314, a transfer destination address of the read buffer 260 of the memory 170, and a data length designated by the read command into the memory 170, and transmits a transfer instruction of read data to the drive 190 corresponding to the drive number 313. Moreover, when a range of read data designated by the read command straddles a plurality of management units of the address conversion table, the process described above is repeated the required number of times and a transfer instruction of read data is transmitted with respect to the data range designated by the read command. Therefore, there may be a plurality of transmission destination drives of the transfer instruction.

Moreover, in this case, for example, a controller (not shown) of the drive 190 receives the transfer instruction of read data, references a transfer parameter in the memory 170 based on the transfer instruction, and transfers read data in a data block of the address 314 to the read buffer 260 based on the referenced transfer parameter. When the data transfer is completed, the controller of the drive 190 transmits a completion notification of the data transfer to the RAP 160.

In S902, the individual command processing unit 520 stands by until the completion notification of the data transfer is received from the drive 190, and advances the process to S903 after receiving the completion notification.

In S903, the individual command processing unit 520 creates a read response (READ RSP) frame for notifying the host of completion of the read command process.

In S904, the individual command processing unit 520 transfers the created response frame to the memory 170.

In S905, the individual command processing unit 520 transmits a transfer instruction of read data in the read buffer 260 to the FE I/F 130. Specifically, for example, the individual command processing unit 520 writes a transfer parameter for transferring read data and a read response frame to the host 10 into the memory 170 and transmits a transfer instruction of the read data to the FE I/F 130.

The FE I/F 130 receives the transfer instruction, references a transfer parameter in the memory 170 based on the transfer instruction, and transfers the read data and the read response frame to the host 10 based on the referenced transfer parameter. Subsequently, the FE I/F 130 transmits a completion notification of the data transfer to the RAP 160.

In S906, the individual command processing unit 520 stands by until the completion notification is received, and ends the process after receiving the completion notification.

Moreover, the individual command processing unit 520 performs a freeing process of a secured read buffer after S906. While this freeing process is generally collectively performed with freeing processes of other read buffers (garbage collection), the freeing process may be performed immediately after S906.

In an individual command process, the RAP 160 can transmit read data to the host 10 without having the MP 140 perform a read command process by respectively transmitting transfer instructions to the drive 190 and the FE I/F 130.

Hereinafter, processes by the MP 140 will be described.

FIG. 10 shows an example of a flow chart of a read command process executed by the MP 140.

The read command process of the MP 140 is performed as the MP 140 executes the IO processing program 220. This process is triggered by the reception of the read command transferred by the individual command processing unit 520 in S805 shown in FIG. 8. Moreover, as described earlier, the read command designates an LU number and an LBA of a storage destination of read data.

In S1001, the MP 140 receives a read command, references the cache directory 240 of the memory 170, and searches whether read data based on the read command is cached in the cache area 250.

In S1002, the MP 140 determines whether or not a result of the search is a dirty hit. The result of the search being a dirty hit represents a case where the read data is being cached and the read data is dirty data. When the search result is a dirty hit (Yes in S1002), the MP 140 advances the process to S1003. In a case where the search result is other than a dirty hit (No in S1002), the MP 140 advances the process to S1007.

Examples of a case where the search result is other than a dirty hit include a case where the read data is being cached and the read data is clean data (when the read data results in a clean hit) and a case where the read data is not being cached (when the read data results in a cache miss).

A case of a dirty hit (Yes in S1002) will now be described. In S1003, the MP 140 creates a read response frame and stores the created read response frame in the memory 170.

In S1004, the MP 140 writes a transfer parameter for transferring read data in the cache area 250 and the read response frame to the host 10 into the memory 170 and transmits a transfer instruction of the read data to the FE I/F 130. The FE I/F 130 receives the transfer instruction of the read data, references the transfer parameter, transfers the read data and the read response frame to the host 10, and transmits a completion notification of data transfer to the MP 140.

In S1005, the MP 140 stands by until the completion notification of the data transfer is received, and advances the process to S1006 after receiving the completion notification.

In S1006, the MP 140 transmits the completion notification of the read command to the RAP 160 and ends the process.

A case other than a dirty hit (No in S1002) will now be described. In S1007, the MP 140 writes a transfer parameter for transferring read data stored in the drive 190 to the cache area 250 into the memory 170 and transmits a transfer instruction of the read data to the drive 190.

Specifically, for example, the MP 140 specifies a set of a drive number and a device address corresponding to a set of an LU number and an LBA designated by the read command. In addition, the MP 140 writes a transfer parameter indicating a transfer source address of a data block of the address and a transfer destination address of the read buffer 260 of the memory 170 into the memory 170, and transmits a transfer instruction of read data to the drive 190 corresponding to the drive number. Moreover, when a range of read data designated by the read command straddles slots of the cache area 250, the process described above is repeated the required number of times and a transfer instruction of read data is transmitted with respect to the data range designated by the read command. Therefore, there may be a plurality of transmission destination drives of the transfer instruction.

In the present embodiment, since the storage apparatus 100 is equipped with virtualization technology unique to storage apparatuses such as thin provisioning, a virtual or logical volume is interposed between an LU and the drive 190. For example, the MP 140 allocates the drive 190 to an LU and allocates the LU to a pool.

In addition, for example, the memory 170 includes conversion information for specifying a device address of the drive 190 from a set of an LU and an LBA. For example, based on an LU number and an LBA designated by a read command or a write command, the MP 140 specifies a drive number and a device address using, as conversion information, a conversion table from a virtual address in the memory 170 into a pool address, a conversion table from a pool address into a logical address, and a conversion table into an address of a logical drive. Therefore, when receiving a read command or a write command, the MP 140 is to reference a plurality of tables that are conversion information and perform a plurality of address conversions until a set of a drive number and a device address corresponding to a set of an LU number and an LBA designated by the read command or the write command is acquired from the designated set of an LU number and an LBA. Moreover, conversion information included in the memory 170 is not limited to the tables described above.

A controller (not shown) of the drive 190 receives the transfer instruction of read data, references a transfer parameter in the memory 170 based on the transfer instruction, and transfers read data in a data block of the address 314 to the read buffer 260 based on the referenced transfer parameter. When the data transfer is completed, the controller of the drive 190 transmits a completion notification of the data transfer to the RAP 160.

In S1008, the MP 140 stands by until the completion notification of the data transfer is received from the drive 190, and ends the process after receiving the completion notification.

In S1009, the MP 140 creates a read response frame for notifying the host 10 of completion of the read command process, and stores the created read response frame in the memory 170.

In S1010, the MP 140 writes a transfer parameter for transferring read data transferred from the drive 190 and the read response frame to the host 10 into the memory 170 and instructs the FE I/F 130 to perform data transfer. The FE I/F 130 receives the transfer instruction of the read data, references the transfer parameter, transfers the read data and the read response frame to the host 10, and transmits a completion notification of data transfer to the MP 140.

In S1011, the MP 140 stands by until the completion notification of the data transfer is received from the FE I/F 130, and advances the process to S1012 after receiving the completion notification.

In S1012, the MP 140 creates an entry registration command for instructing registration of an entry based on the read command process and transmits the entry registration command to the RAP 160.

The entry registration command includes the set of an LU number and an LBA and the set of the drive number of the drive 190 and the device address of the data block specified in S1007. A description of the entry registration command will be provided later.

The RAP 160 registers an entry in the address conversion table 310 in accordance with the entry registration command. In addition, the RAP 160 transmits an entry registration response 1400 notifying completion of the entry registration to the address conversion table 310 to the MP 140. A description of the entry registration response 1400 will be provided later.

In S1013, the MP 140 stands by until receiving the entry registration response 1400 to an entry registration command 1300, and ends the process to S1014 after receiving the entry registration response 1400.

In S1014, the MP 140 transmits a completion notification to the RAP 160 and ends the process.

According to the process described above, in a case other than a dirty hit, by transmitting a correspondence between a set of an LU number and an LBA provided to the host 10 as a storage destination of read data and a set of a drive number and a device address of a data block of the drive 190 where the read data is actually stored to the RAP 160 in an entry registration command when transmitting the read data in the drive 190 to the host 10, the RAP 160 can register these associations in the address conversion table 310. Accordingly, subsequently, until the data block storing the read data is changed, the RAP 160 having received the read command designating the LU number and the LBA is capable of reading, based on the address conversion table 310, the read data from the drive 190 at a higher speed than when the process is performed by the MP 140.

In addition, in a case of a dirty hit, since latest read data exists in the cache area 250, the read data in the cache area 250 can be transmitted to the host 10 based on the read command transferred from the RAP 160.

Figure 13:
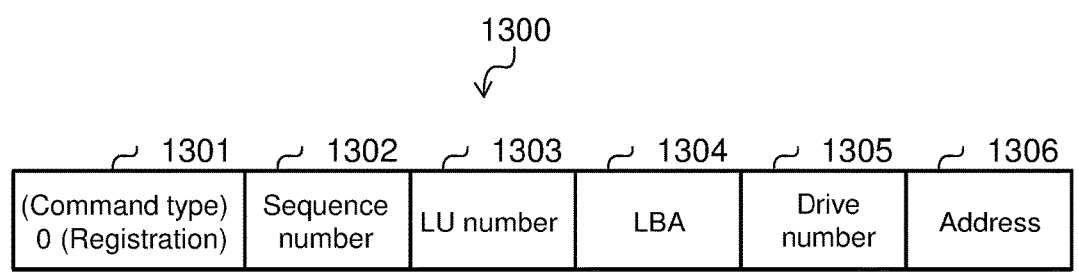
FIG. 13 shows an example of a format of an entry registration command.

FIG. 13 shows an example of a format of an entry registration command. The entry registration command 1300 includes a plurality of fields. For example, the respective fields are: a command type 1301 indicating a type of the command; a sequence number 1302 of the command; an LU number 1303 of an LU that is a target of the command; an LBA 1304 that is a target of the command; a drive number 1305 of the drive 190 that is a target of the command; and an address 1306 of a data block that is a target of the command.

For example, a command type 1301 of "0" means that the command is an entry registration command. For example, the sequence number 1302 is an identifier of the entry registration command and, at the same time, a number which links the entry registration command and a response thereto with each other. Every time the MP 140 issues an entry registration command, the MP 140 increments the sequence number 1302 by one. Moreover, when the sequence number 1302 exceeds a designated maximum value, the MP 140 may reset the sequence number to zero and reuse the sequence number. The LU number 1303 and the LBA 1304 are the LU number and the LBA designated by a read command. The drive number 1305 and the address 1306 represent a device address of the drive 190 corresponding to the set of the LU number 1303 and the LBA 1304.

Figure 14:
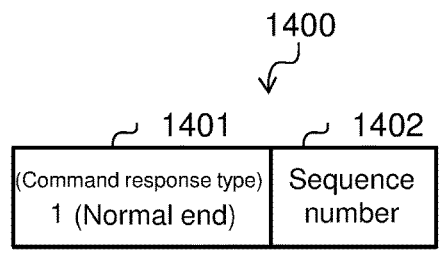
FIG. 14 shows an example of a format of an entry registration response 1400.

FIG. 14 shows an example of a format of the entry registration response 1400. The entry registration response 1400 includes a plurality of fields. For example, the respective fields are: a command response type 1401 indicating a type of the response; and a sequence number 1402 of the response. For example, a command response type 1401 of "1" means that a process based on the entry registration command 1300 has ended normally.

Figure 11:
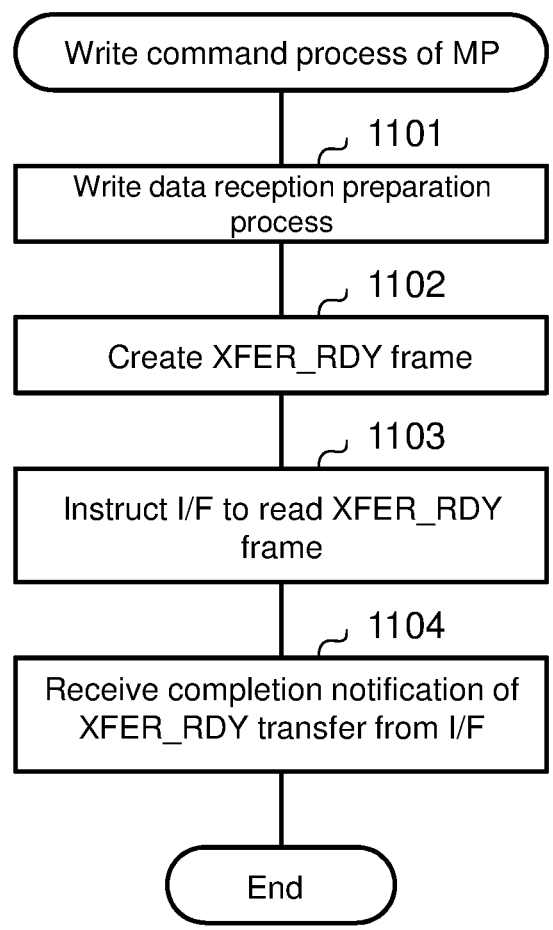
FIG. 11 shows an example of a flow chart of a write command process of the MP 140.

FIG. 11 shows an example of a flow chart of a write command process of the MP 140.

The write command process of the MP 140 is performed as the MP 140 executes the IO processing program 220. The MP 140 performs the write command process when receiving a write command transferred from the RAP 160 in S811 of FIG. 8. Moreover, as described earlier, the write command designates an LU number and an LBA of a storage destination of write data.

In S1101, a preparation process for receiving write data is performed. In the preparation process, for example, the FE I/F 130 reserves a buffer area for receiving the write data and the MP 140 reserves an area for storing the write data in the cache area 250.

In S1102, the MP 140 creates a transfer ready (XFER_RDY) frame and stores the created transfer ready frame in the memory 170.

In S1103, the MP 140 writes a transfer parameter for transferring the transfer ready frame from the memory 170 to the host 10 into the memory 170, and transmits a transfer instruction of the write data to the FE I/F 130. The FE I/F 130 receives the transfer instruction of the write data, references the transfer parameter, and transfers the transfer ready frame to the host 10.

In S1104, the MP 140 stands by until a completion notification of the transfer is received from the FE I/F 130, and ends the process after receiving the completion notification.

According to the process described above, when the MP 140 receives a write command from the RAP 160, the MP 140 can perform preparation for receiving write data.

Moreover, a process performed when the MP 140 receives a management command from the RAP 160 based on S813 in FIG. 8 will be omitted. When receiving a management command, the MP 140 performs a management command process by a conventionally known method.

Figure 12:
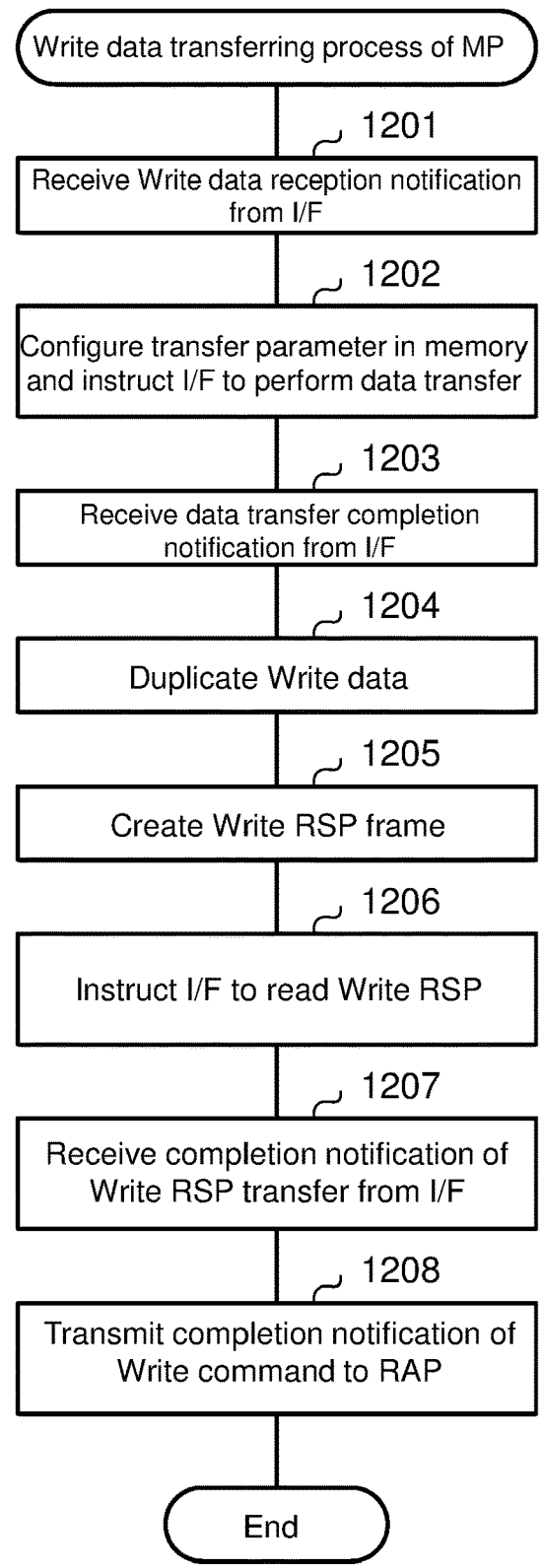
FIG. 12 shows an example of a flow chart of a write data transferring process of the MP 140.

FIG. 12 shows an example of a flow chart of a write data transferring process of the MP 140.

After the write command process, the MP 140 successively performs a write data transferring process. When the host 10 receives a transfer ready frame from the FE I/F 130, the host 10 transmits write data to the FE I/F 130. Upon receiving the write data from the host 10, the FE I/F 130 transmits a write data reception notification to the MP 140.

In S1201, the MP 140 receives a write data reception notification from the FE I/F 130.

In S1202, based on a write command, the MP 140 writes a transfer parameter for transferring write data from the host 10 to an area reserved in the cache area 250 of the controller 110 into the memory 170, and transmits a transfer instruction of the write data to the FE I/F 130. The FE I/F 130 receives the transfer instruction, references the transfer parameter, and transfers the write data to the reserved area from the host 10. Once the transfer of the write data is completed, the FE I/F 130 transmits a transfer completion notification of the write data to the MP 140.

In S1203, the MP 140 receives the transfer completion notification of the write data from the FE I/F 130.

In S1204, the MP 140 transmits the write data to a cache area of the other controller 120. Accordingly, the write data is duplicated in the cache area and reliability of the data can be ensured.

In S1205, the MP 140 creates a write response (Write RSP) frame and stores the created write response frame in the memory 170.

In S1206, the MP 140 writes a transfer parameter for transferring the write response frame from the memory 170 to the host 10 into the memory 170, and transmits a transfer instruction of the write response frame to the FE I/F 130. The FE I/F 130 receives the transfer instruction, transfers the write response frame in the memory 170 to the host 10, and transmits a completion notification of the transfer to the MP 140.

In S1207, the MP 140 stands by until the completion notification of the transfer is received from the FE I/F 130, and advances the process to S1208 after receiving the completion notification.

In S1208, the MP 140 transmits the completion notification of the write command to the RAP 160 and ends the process.

According to the process described above, write data can be stored in the cache area 250 and a completion notification can be transmitted to the RAP 160. Subsequently, the MP 140 writes the write data having been written into the cache area 250 into the drive 190 asynchronously with the write data transferring process. This control is performed as the MP 140 executes the drive access program 210.

Moreover, while an example in which the storage apparatus 100 includes one RAP 160 has been described in the present embodiment, alternatively, the storage apparatus 100 may include a plurality of RAPs 160. In this case, for example, the plurality of RAPs 160 may be coupled to the switch 150. In addition, when the MP 140 includes a plurality of cores, a part of the cores of the MP 140 may perform a process of the RAP 160 in place of the RAP 160.

Embodiment 2

Hereinafter, Embodiment 2 will be described.

Embodiment 2 differs from Embodiment 1 in the read command process of the MP 140. Moreover, a configuration of the computer system is similar to that of Embodiment 1. Hereinafter, differences in configurations and steps of processes from Embodiment 1 will be mainly described. Configurations and steps of processes that are similar to those of Embodiment 1 will be denoted with similar reference numerals and a description thereof will be omitted or abridged.

Figure 15:
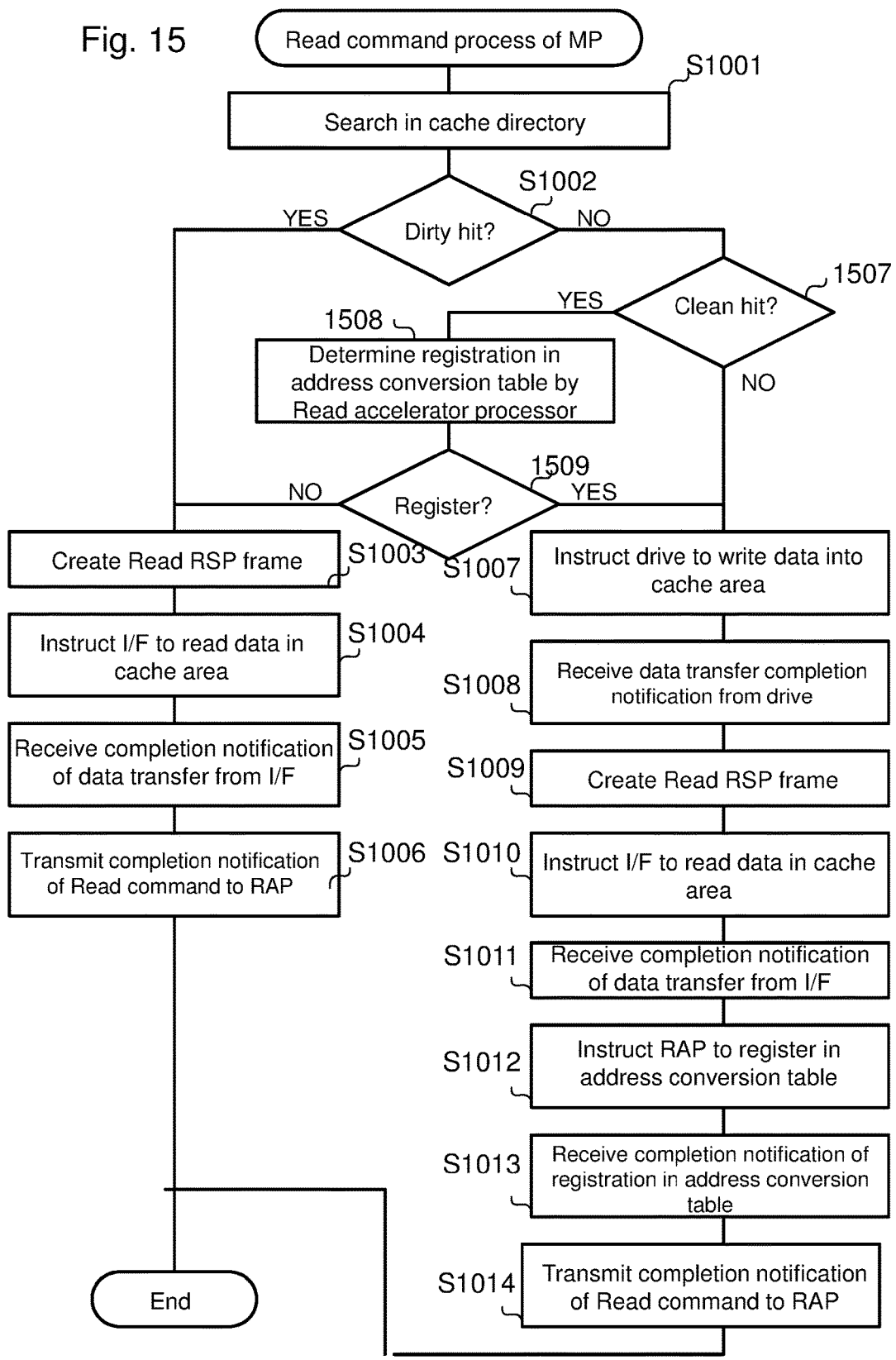
FIG. 15 shows an example of a flow chart of a read command process of the MP 140 according to Embodiment 2.

FIG. 15 shows an example of a flow chart of a read command process of the MP 140 according to Embodiment 2.

The read command process according to Embodiment 2 differs from that of Embodiment 1 in that read data based on a read command is being cached in the cache area 250 and that a process for a case where read data is clean data (when read data results in a clean hit) has been added.

In S1002, the MP 140 determines whether or not a search result indicates a dirty hit by read data. When the search result is a dirty hit (Yes in S1002), the MP 140 advances the process to S1003. When the search result is other than a dirty hit (No in S1002), the MP 140 advances the process to S1507.

In S1507, the MP 140 determines whether or not the read data results in a clean hit. When the result is not a clean hit (No in S1507) or, in other words, in a case of a cache miss, the MP 140 advances the process to S1007. In steps S1007 and thereafter, the MP 140 writes the read data from the drive 190 into the cache area 250 and instructs the RAP 160 to register an entry in the address conversion table 310. Since this is a similar process to Embodiment 1, a description thereof will be omitted. On the other hand, when the result is a clean hit (Yes in S1507), the MP 140 advances the process to S1508.

In S1508, the MP 140 determines whether or not to register the address conversion table 310. An example of the determination made in S1508 will now be described. For example, the MP 140 may observe its own load, and may determine not to register an entry in the address conversion table 310 when the load on the MP 140 is smaller than a threshold configured in advance but determine to register an entry in the address conversion table 310 when the load on the MP 140 is equal to or larger than the threshold configured in advance.

When the MP 140 determines not to register the address conversion table (No in S1509), the MP 140 executes the process of S1003 and thereafter. According to this process, read data in the cache area is transmitted to the host 10. Therefore, the MP 140 need not read the read data from the drive 190 and response time to a read command can be reduced.

When the MP 140 determines to register the address conversion table 310 (Yes in S1509), the MP 140 executes the process of S1007 and thereafter. According to this process, read data read to the cache area 250 from the drive 190 is transmitted to the host 10 and, at the same time, the entry registration command 1300 of the address conversion table 310 is transmitted to the RAP 160. Accordingly, the RAP 160 can be caused to execute a subsequent read command process. A load applied to the MP 140 by the read command process can be offloaded to the RAP 160.

According to the process described above, when read data results in a clean hit, the MP 140 can determine, based on prescribed conditions, whether to make the MP 140 or the RAP 160 an executing entity of a read command process based on a subsequently-transmitted read command. For example, when the determination is made based on an observation result of the load on the MP 140, read performance of the storage apparatus 100 can be improved by offloading the load on the MP 140 to the RAP 160.

Embodiment 3

Hereinafter, Embodiment 3 will be described with reference to FIGS. 16 and 17. Embodiment 3 differs from Embodiments 1 and 2 in that a case where the MP 140 performs a sequential read is taken into consideration. Moreover, a configuration of the computer system is similar to those of Embodiments 1 and 2. Hereinafter, differences in configurations and steps of processes from Embodiments 1 and 2 will be mainly described. Configurations and steps of processes that are similar to those of Embodiments 1 and 2 will be denoted with similar reference numerals and a description thereof will be omitted or abridged.

Figure 16:
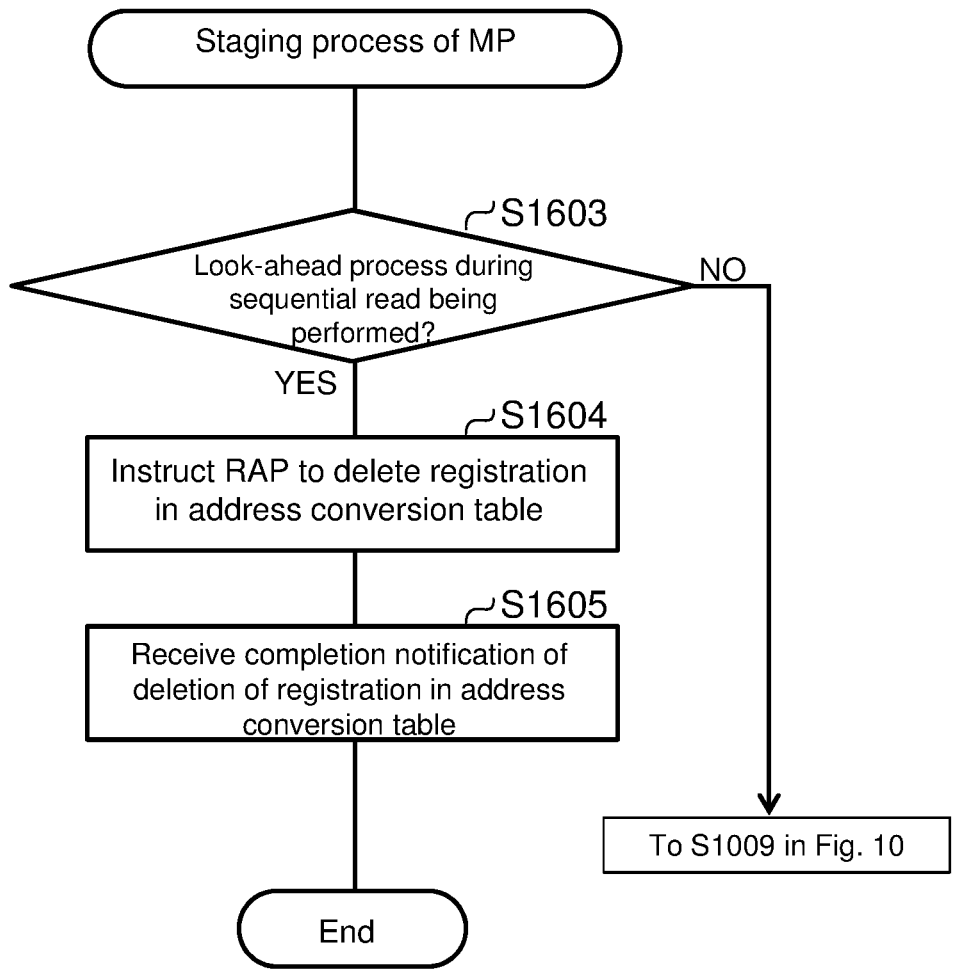
FIG. 16 shows an example of a flow chart of a staging process of the MP 140 according to Embodiment 3.
Figure 17:
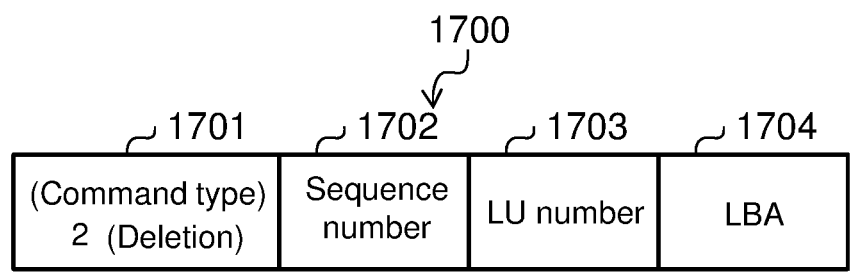
FIG. 17 shows an example of a format of an entry deletion command.

FIG. 16 shows an example of a flow chart of a staging process of the MP 140 according to Embodiment 3.

The staging process is a process performed in the read command process (FIGS. 10 and 15) of the MP. Specifically, for example, after the MP 140 receives a completion notification of data transfer from the drive 190 (S1008), the MP 140 advances the process to S1603.

In S1603, the MP 140 determines whether or not a look-ahead process during a sequential read is being executed based on the read command process. For example, this is a process in which, when the MP 140 determines that a read instruction indicates reading consecutive pieces of data, the MP 140 transfers data in an LBA consecutive to an LBA based on the read instruction to the cache area 250 in advance. Due to the look-ahead process, read performance can be improved.

When a look-ahead process during a sequential read is not being executed (No in S1603), since this means that the read command process is a normal read command process, the MP 140 advances the process to S1009. On the other hand, when a look-ahead process during a sequential read is being executed, the MP 140 advances the process to S1604.

In S1604, the MP 140 creates an entry deletion command for instructing deletion of a target entry of the address conversion table 310 and transmits the entry deletion command to the RAP 160. The target entry is an entry containing a storage location of data to be read from the drive 190 by the sequential read.

The RAP 160 receives the entry deletion command and deletes the target entry of the address conversion table 310. In addition, the RAP 160 transmits a deletion completion notification of the target entry of the address conversion table 310 to the MP 140.

In S1605, the MP 140 receives the entry deletion completion notification. In addition, the MP 140 executes S1009, S1010, S1011, and S1014 in FIG. 10 and ends the process.

An example of a format of an entry deletion command will now be described with reference to FIG. 17. An entry deletion command 1700 includes a plurality of fields. For example, the respective fields are: a command type 1701 indicating a type of the command; a sequence number 1702 of the command; an LU number 1703 of an LU that is a target of the command; and an LBA 1704 that is a target of the command.

For example, a command type 1701 of "2" means that the command is a command to cause an entry of the address conversion table 310 to be deleted. Specifically, the command instructs deletion of an entry including a set of the LU number 1703 and the LBA 1704. For example, the sequence number 1702 is an identifier of the entry deletion command and, at the same time, links the entry deletion command and a response thereto with each other. A sequence number may be handled in a same manner as the entry registration command 1300.

According to Embodiment 3, by transferring data consecutive to data read from the drive 190 during a sequential read to the cache area 250, even when the MP 140 performs a read command process, a load on the MP 140 and a response time to the read command can sometimes be reduced.

Embodiment 4

Hereinafter, Embodiment 4 will be described with reference to FIG. 18. Embodiment 4 differs from Embodiment 1 in a write data transferring process of the MP 140. Moreover, a configuration of the computer system is similar to that of Embodiments 1 to 3. Hereinafter, differences in configurations and steps of processes from Embodiments 1 to 3 will be mainly described. Configurations and steps of processes that are similar to those of Embodiments 1 to 3 will be denoted with similar reference numerals and a description thereof will be omitted or abridged.

Figure 18:
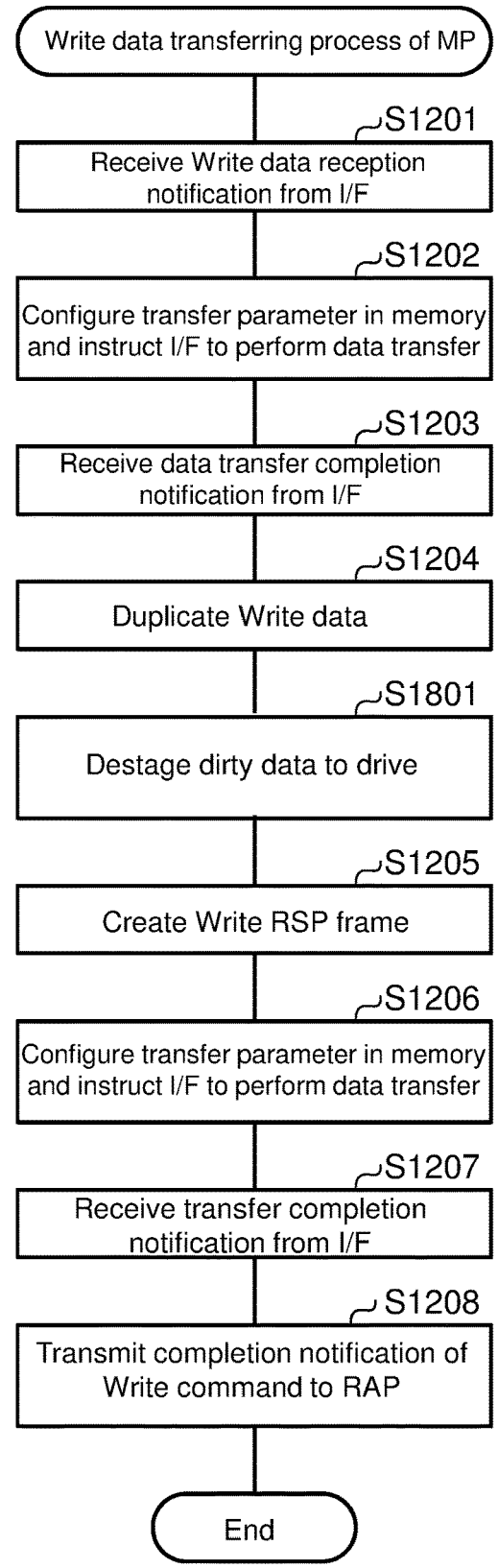
FIG. 18 shows a flow of a write data transferring process of the MP 140 according to Embodiment 4.

FIG. 18 shows a flow of the write data transferring process of the MP 140 according to Embodiment 4.

Following S1204, in S1801, the MP 140 destages write data (dirty data) in the cache area 250 to the drive 190. Processes of S1205 and thereafter are similar to Embodiment 1.

According to the process described above, after storing write data in the cache area 250, the MP 140 synchronizes the drive 190 with the cache area 250. In this manner, since write data (dirty data) is destaged to a drive in the write data transferring process, in a next read command process of the MP 140, an address indicating the data is to be registered in the address conversion table. After the registration, since the data results in a search hit in a search of the address conversion table (S802) performed by the individual command processing unit 520 of the RAP 160, the number of read commands processed by the RAP 160 can be increased.

Embodiment 5

Hereinafter, Embodiment 5 will be described with reference to FIG. 19. Embodiment 5 differs from Embodiments 1 to 4 in a configuration of a storage apparatus 1000.

Figure 19:
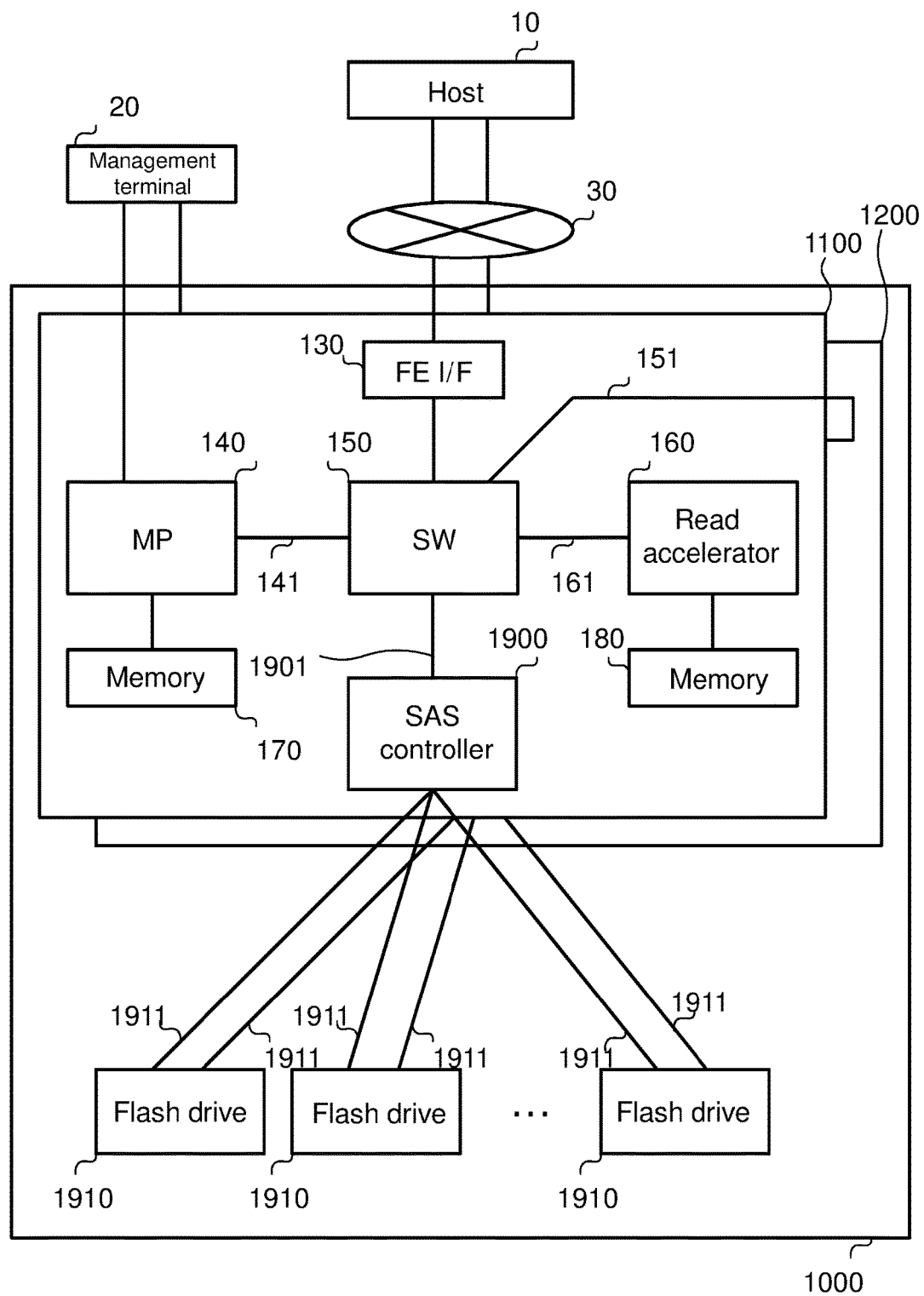
FIG. 19 is a configuration diagram of a computer system according to Embodiment 5.

FIG. 19 is a configuration diagram of a computer system according to Embodiment 1.

The computer system includes the host 10, the management terminal 20, and the storage apparatus 1000 coupled to the host 10 via the network 30. The storage apparatus 1000 includes controllers 1100 and 1200. Since the controllers 1100 and 1200 are basically configured in a similar manner, the controller 1100 will be described hereinafter.

The present embodiment differs from Embodiment 1 in that the controller 1100 includes an SAS (Serial attached SCSI) controller 1900. The SAS controller 1900 is coupled to the switch 150 via a signal line 1901. An SAS port of the SAS controller 1900 and an SAS port of a drive 1910 are coupled to each other via an SAS link 1911. Note that the SAS ports in the SAS controller 1900 and the drive 1910 have been omitted in the drawing.

The SAS controller 1900 converts a data transfer protocol (an SAS protocol) between the drive 1910 and the controller 1100 into a data transfer protocol inside the controller 110 1100 and vice versa. The SAS controller 1900 operates as an SAS initiator device and the drive 1910 operates as an SAS target device. Moreover, one or a plurality of SAS expanders may be coupled between the SAS controller 1900 and the drive 1910. An SAS expander refers to a device having a function of a switch in an SAS network.

In a read command process by the RAP 160, the individual command processing unit 520 transmits a transfer instruction of read data designated by a read command to the SAS controller 1900 and the SAS controller 1910 reads read data in the drive 1900.

In addition, even in a read command process or a write command process by the MP 140, the MP 140 issues an instruction to the SAS controller 1900 instead of the drive 1910 and the SAS controller 1910 reads and writes data in the drive 1910. Moreover, the field of the drive number 1305 in the address conversion table 310 may store an SAS address corresponding to the drive 1910 instead of a drive number.

According to the present embodiment, the SAS protocol is used to couple the controllers 1100 and 1200 and the drive 1900 to each other. As a result, a larger number of drives 1910 can be coupled as compared to, for example, coupling provided by other transfer protocols such as PCI. In addition, the use of SAS expanders enables drives 1910 to be additionally installed or uninstalled without stopping the network.

While several embodiments have been described above, it is to be understood that the described embodiments merely represent examples for illustrating the present invention and that the scope of the present invention is not limited to the embodiments. The present invention can also be implemented in various other modes.

Moreover, a command corresponds to a read command, a write command, a management command, or the like, and a process designated by a command other than a read command corresponds to, for example, a write command process or a management command process.

REFERENCE SIGNS LIST

10 Host computer
20 Management terminal
30 Network
100 Storage apparatus
110, 120 Storage controller
130 Frontend interface
140 Processor
160 Read accelerator processor
170 Memory
180 Memory

The invention claimed is:

1. A storage apparatus, comprising:
a controller coupled to a host computer; and
a physical storage device coupled to the controller, wherein
the controller includes:
  a processor configured to provide the host computer with a logical volume based on the physical storage device;
  a first memory coupled to the processor;
  a control device coupled to the host computer, the physical storage device, and the processor; and
  a second memory coupled to the control device,
the control device writes into the second memory, according to an entry registration command from the processor, address information that associates a logical address in the logical volume with a device address, which is an address in the physical storage device,
the control device, upon receiving a command from the host computer:
  determines whether or not the command is a read command, and when determination is made that the command is a read command, identifies a first logical address designated by the read command and determines whether or not the first logical address is included in the address information,
  when the first logical address is included in the address information, specifies a first device address corresponding to the first logical address,
  reads read data stored in an area indicated by the first device address and transmits the read data to the host computer,
  when the first logical address is not included in the address information, transmits the command to the processor, and
  when determination is made that the command is a command other than a read command, transmits the command to the processor, and
the processor executes a process designated by the command received from the control device.

2. The storage apparatus according to claim 1, wherein the processor is configured to,
when receiving the read command, identify the first logical address designated by the read command and transmit the read data indicated by the first logical address to the host computer.

3. The storage apparatus according to claim 2, wherein the first memory is configured to store conversion information for specifying the device address from the logical address,
the processor is configured to
  determine whether or not dirty data is stored in a cache area of the first memory based on the first logical address designated by the read command,
  when the dirty data is not stored in the cache area, specify a first device address corresponding to the first logical address, based on the conversion information,
  read data stored in an area indicated by the first device address to the cache area and transmit the read data to the host computer, and
  transmit the first logical address and the first device address to the control device, and
the control device is configured to
  receive the first logical address and the first device address, and register in the address information the first logical address and the first device address in association with each other.

4. The storage apparatus according to claim 3, wherein the processor is configured to, when read data that is clean data is stored in the cache area based on the first logical address designated by the read command or when the read data is not stored in the cache area, determine that dirty data is not stored in the cache area.

5. The storage apparatus according to claim 4, wherein the control device is configured to:
when the command is determined to be a write command, determine whether or not a second logical address of the logical volume designated by the write command is registered in the address information,
when the second logical address is registered in the address information, delete the second logical address from the address information, and
transmit the write command to the processor.

6. The storage apparatus according to claim 5, wherein the processor is configured to:
receive write data based on the write command,
specify a second device address corresponding to the second logical address, based on information in the first memory,
store the write data in a cache area of the first memory and also in an area indicated by the second device address, and
transmit a response based on the write command to the host computer.

7. The storage apparatus according to claim 4, wherein the processor is configured to:
monitor a load on the processor,
when read data that is the clean data is stored in the cache area and in an area indicated by the first address, determine whether or not the load is larger than a threshold configured in advance, when the load is larger than the threshold, transmit the read data to the host computer, and transmit the first logical address and the first device address to the control device, and the control device is configured to:

receive the first logical address and the first device address, and register in the address information the first logical address and the first device address in association with each other.

8. The storage apparatus according to claim 7, wherein the processor is configured to:

with respect to a logical address consecutive to the first logical address in the logical volume designated by the read command, when a look-ahead process, in which read data stored in an area of a physical storage device corresponding to the logical volume is read in advance, is being executed, delete a third device address of an area storing data to be read by the look-ahead process from the address information.

9. The storage apparatus according to claim 1, wherein the physical storage device is a non-volatile semiconductor memory.

10. The storage apparatus according to claim 1, wherein the control device is configured to create a plurality of sorted queues in the second memory, the plurality of sorted queues respectively correspond to a plurality of logical addresses, the control device is configured to, in a command sorting process:

when receiving the command from the host computer, determine whether or not the command is an IO (Input or Output) command, when determination is made that the command is an IO command, identify a first logical address in the logical volume designated by the IO command, select a first sorted queue corresponding to the first logical address from the plurality of sorted queues, and enqueue the IO command to the first sorted queue, and the control device is configured to dequeue the IO command in the first sorted queue and execute a process designated by the IO command.

11. The storage apparatus according to claim 10, wherein the control device is configured to, when determination is made that the command is not the IO command in the command sorting process, enqueue the command to a second sorted queue configured in advance from the plurality of sorted queues, and dequeue the command in the second sorted queue and transmit the command to the processor.

12. The storage apparatus according to claim 11, wherein the control device is configured to, when determination is made that the IO command is a read command in the command sorting process, perform a plurality of command processes in parallel.

13. The storage apparatus according to claim 11, wherein the control device is capable of executing a plurality of individual command processes for executing a single command in the command process, and the control device is configured to, when determination is made that the IO command is a read command in the command process, execute the first individual command process with respect to the read command when a state is established in which at least one individual command process among the plurality of individual command processes is not being executed.

14. The storage apparatus according to claim 13, wherein the control device is configured to, when determination is made that the command is a write command in the command process, execute an individual command process with respect to the write command when a state is established in which all of the plurality of individual command processes are not being executed.

15. A method executed by the controller including a processor which provides a host computer with a logical volume based on a physical storage device and a control device coupled to the host computer, the physical storage device, and the processor, the method comprising, with the use of the control device:

writing into the second memory, according to an entry registration command from the processor, address information that associates a logical address in the logical volume, with a device address, which is an address in the physical storage device;

upon receiving a command from the host computer, determining whether or not the command is a read command, and when determination is made that the command is a read command, identifying a first logical address designated by the command and determine whether or not the first logical address is included in the address information;

when the first logical address is included in the address information, specifying a first device address corresponding to the first logical address;

reading read data stored in an area indicated by the first device address and transmitting the read data to the host computer;

when the first logical address is not included in the address information, transmitting the command to the processor; and when determination is made that the command is a command other than a read command, transmitting the command to the processor; and with the use of the processor executing a process designated by the command received from the control device.

* * * * *